(12) United States Patent
Magai et al.

(10) Patent No.: US 8,280,196 B2
(45) Date of Patent: Oct. 2, 2012

(54) IMAGE RETRIEVAL APPARATUS, CONTROL METHOD FOR THE SAME, AND STORAGE MEDIUM

(75) Inventors: Koichi Magai, Tokyo (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/764,660

(22) Filed: Apr. 21, 2010

(65) Prior Publication Data

US 2010/0290708 A1    Nov. 18, 2010

(30) Foreign Application Priority Data

May 12, 2009 (JP) ................................. 2009-115917
Jun. 17, 2009 (JP) ................................. 2009-144641

(51) Int. Cl.
*G06K 9/54* (2006.01)
*G06K 9/46* (2006.01)

(52) U.S. Cl. ...................................... 382/305; 382/195
(58) Field of Classification Search ............. 382/173, 382/190, 195, 209, 218, 276, 305
See application file for complete search history.

(56) References Cited

U.S. PATENT DOCUMENTS

| 5,905,811 | A  |   | 5/1999  | Shiiyama et al. |      |
|-----------|----|---|---------|-----------------|------|
| 6,400,853 | B1 |   | 6/2002  | Shiiyama        |      |
| 6,804,683 | B1 | * | 10/2004 | Matsuzaki et al. | 1/1 |
| 7,400,784 | B2 | * | 7/2008  | Joly            | 382/305 |
| 7,418,135 | B2 |   | 8/2008  | Shiiyama        |      |
| 8,121,371 | B2 | * | 2/2012  | Dewaele         | 382/128 |

FOREIGN PATENT DOCUMENTS

| JP | 8-249349  | 9/1996 |
| JP | 10-260983 | 9/1998 |

OTHER PUBLICATIONS

U.S. Appl. No. 12/778,953, filed May 12, 2010, Applicants: Shiiyama, et al.
Schmid, et al., "Local Grayvalue Invariants for Image Retrieval", IEEE Transactions on Pattern Analysis and Machine Intelligence, vol. 19, No. 5., pp. 530-535 (May 1997).
Harris, et al., "A Combined Corner and Edge Detector", pp. 147-152 (1988).
Koenderink, et al., "Representation of Local Geometry in the Visual System", Biological Cybernetics, pp. 367-375 (1987).

* cited by examiner

*Primary Examiner* — Daniel Mariam
(74) *Attorney, Agent, or Firm* — Fitzpatrick, Cella, Harper & Scinto

(57) ABSTRACT

An image retrieval apparatus configured so as to enable a global feature method and a local feature method to complement each other is provided. After obtaining a retrieval result candidate using the local feature method, the image retrieval apparatus further verifies global features already registered in a database, with regard to the retrieval result candidate image. A verification position of the global features is estimated using the local features.

20 Claims, 13 Drawing Sheets

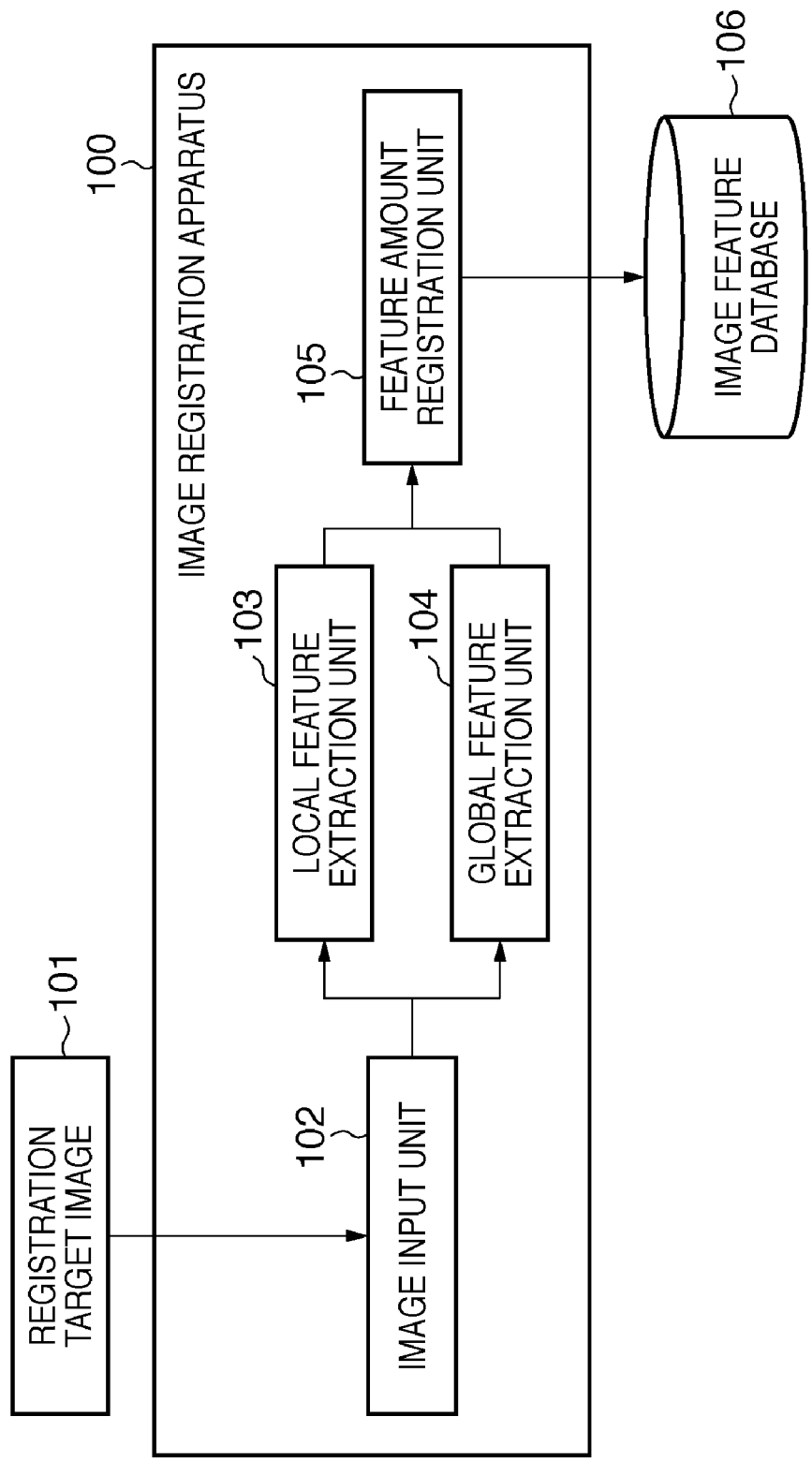

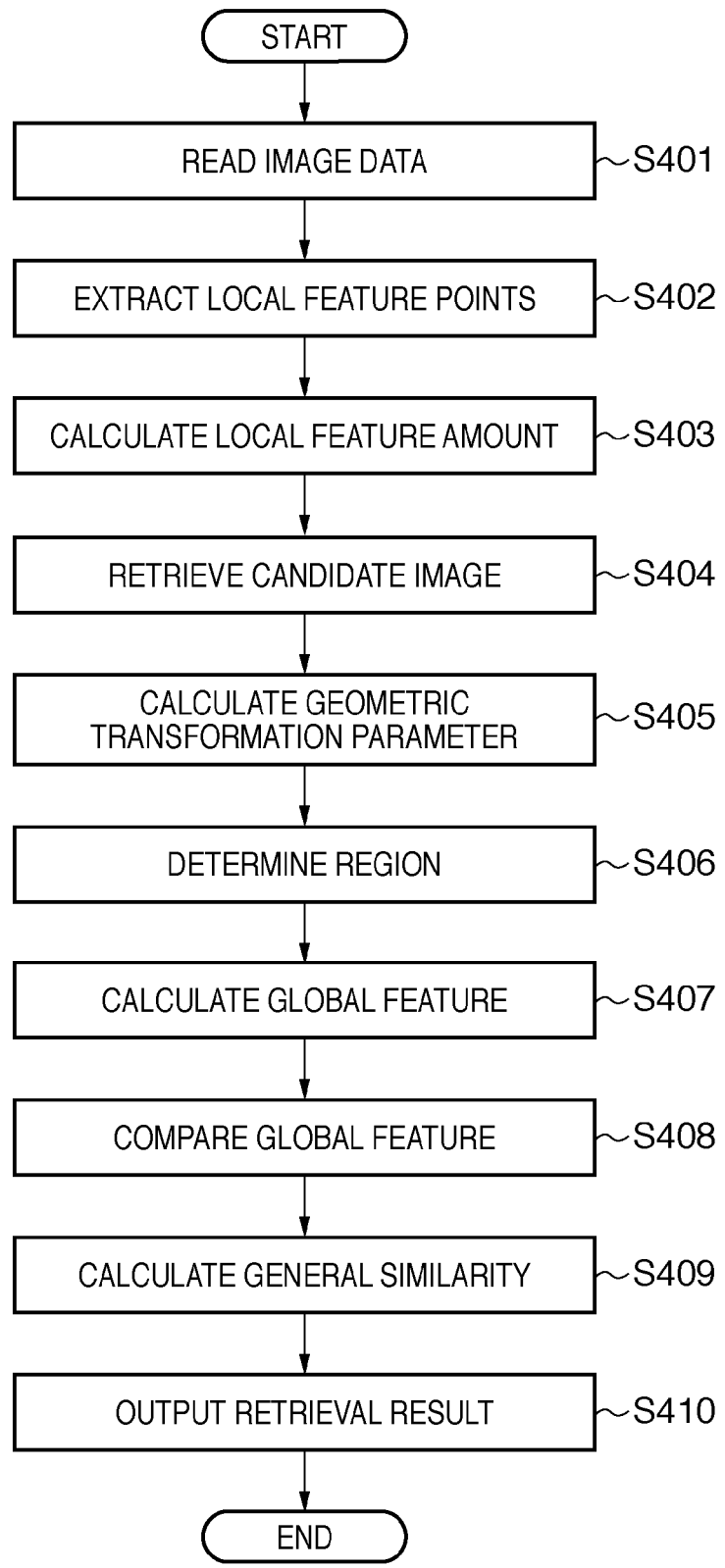

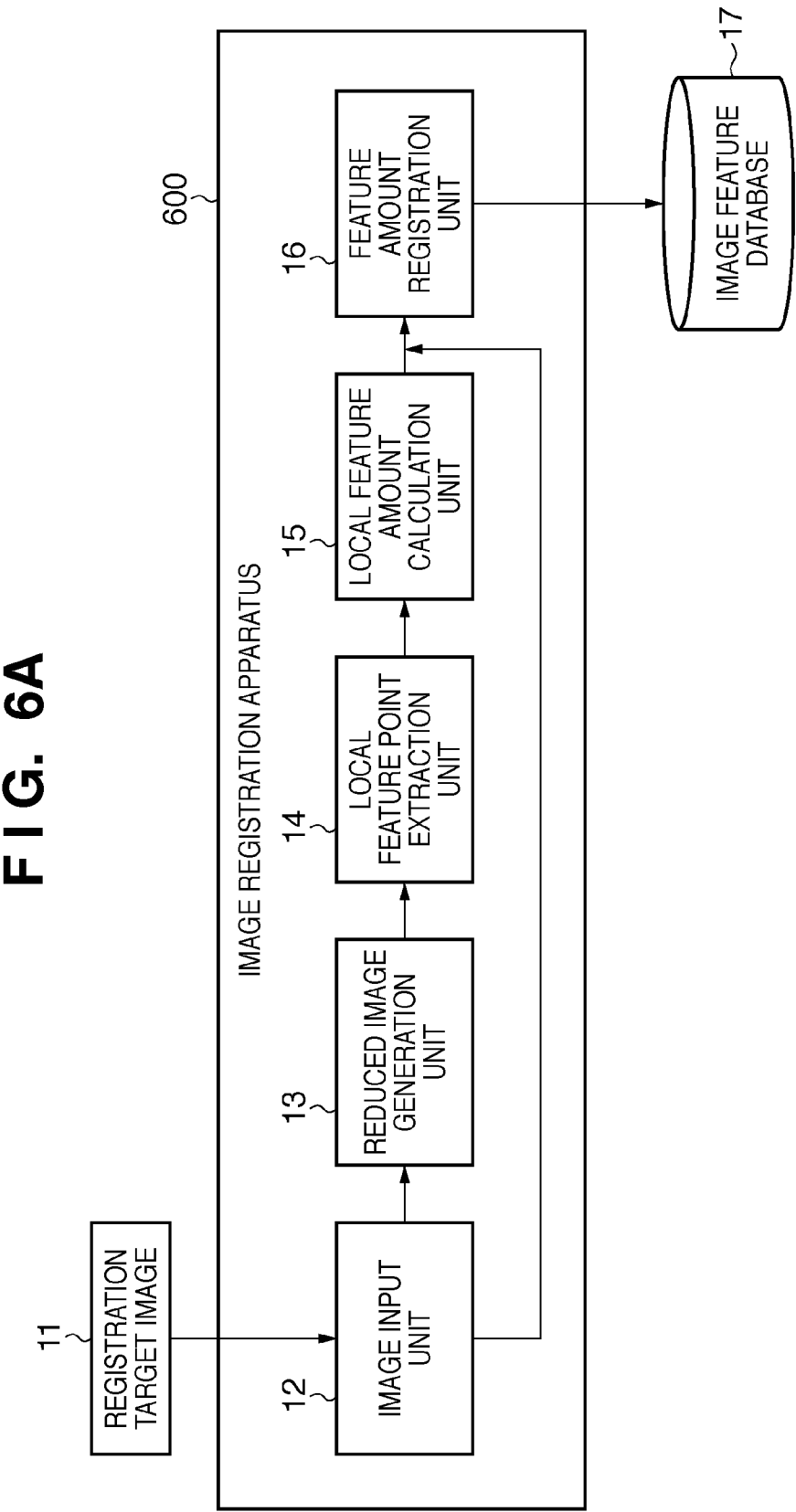

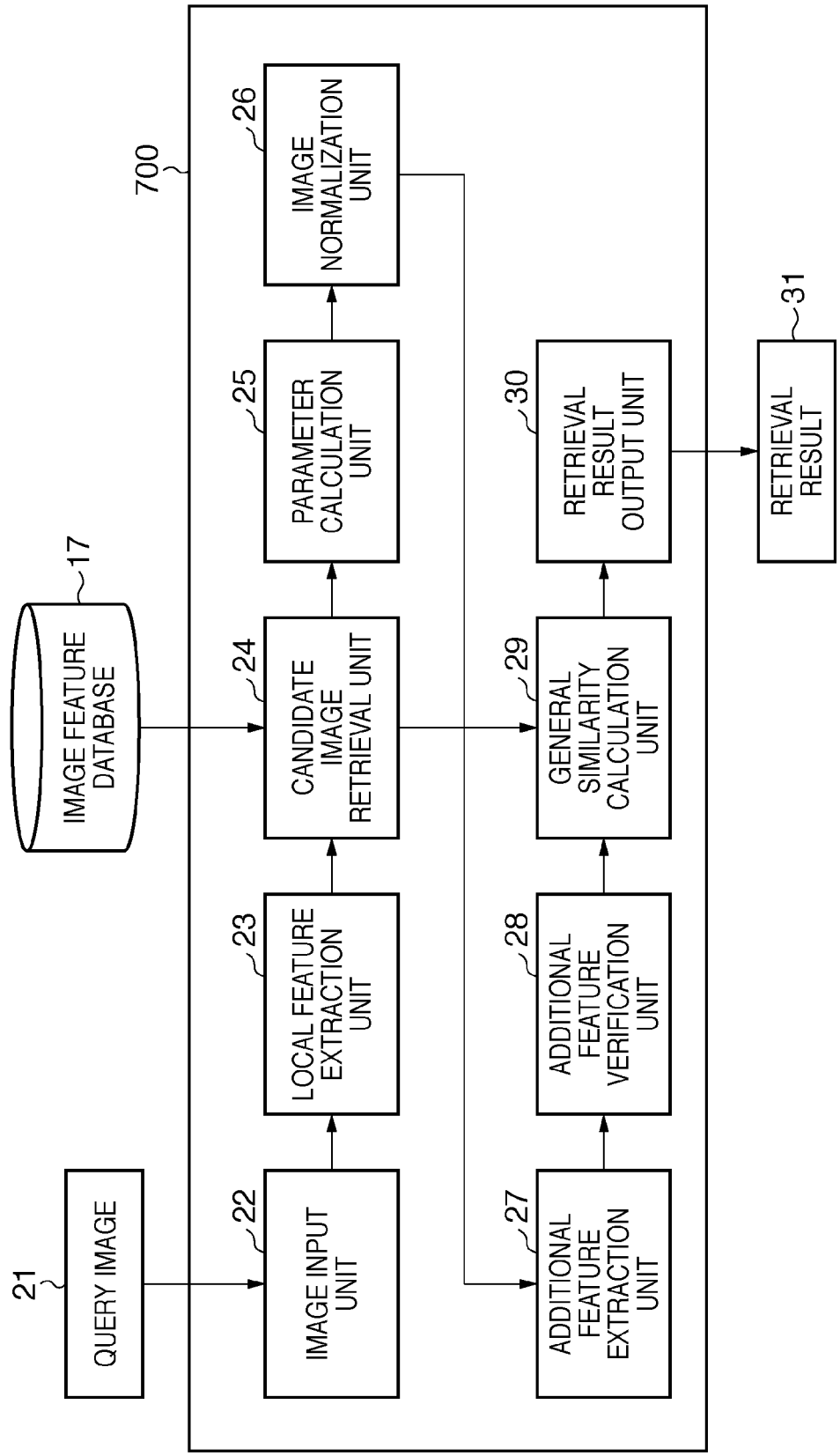

FIG. 7A

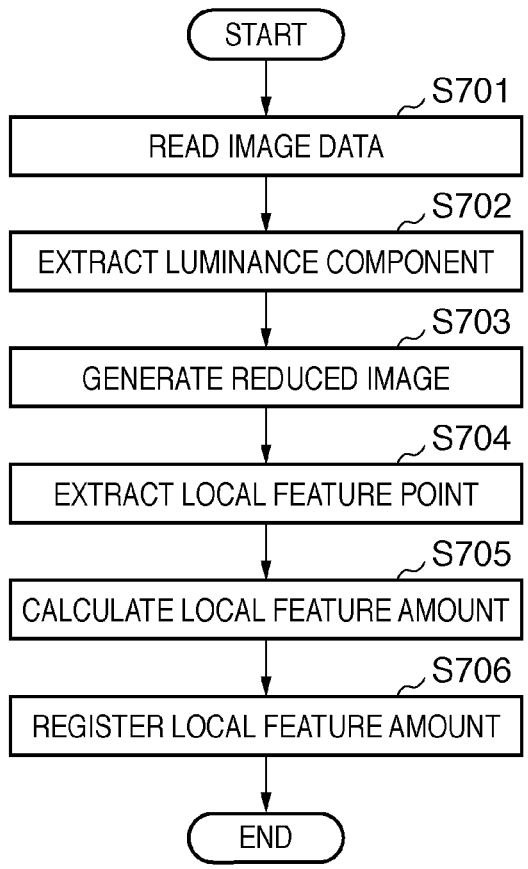

- START
- S701 READ IMAGE DATA
- S702 EXTRACT LUMINANCE COMPONENT
- S703 GENERATE REDUCED IMAGE
- S704 EXTRACT LOCAL FEATURE POINT
- S705 CALCULATE LOCAL FEATURE AMOUNT
- S706 REGISTER LOCAL FEATURE AMOUNT
- END

FIG. 7B

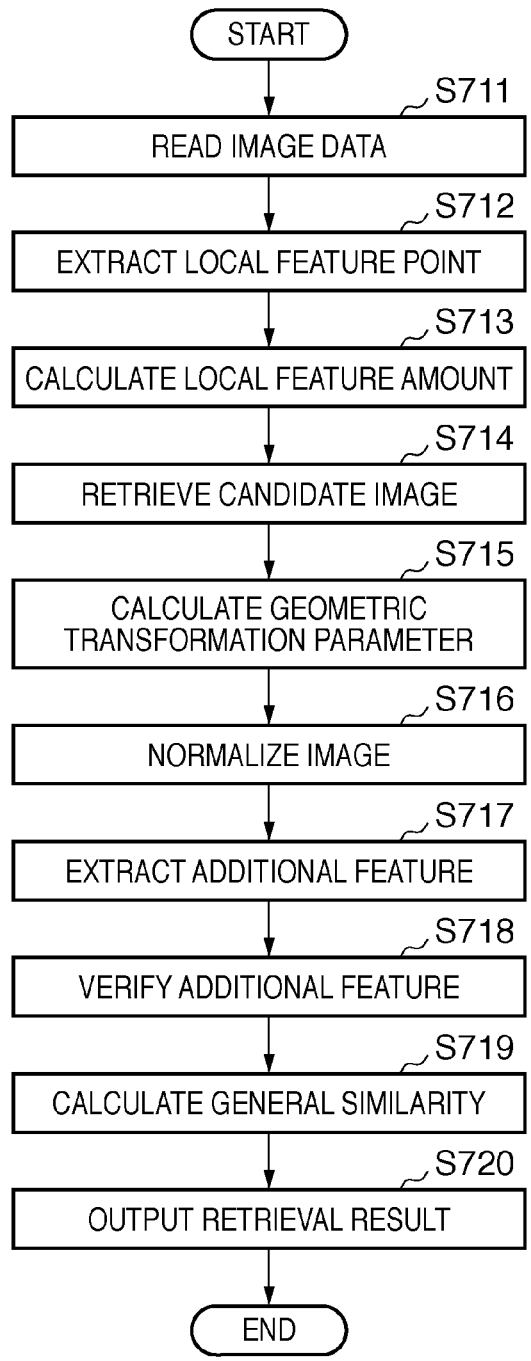

- START
- S711 READ IMAGE DATA
- S712 EXTRACT LOCAL FEATURE POINT
- S713 CALCULATE LOCAL FEATURE AMOUNT
- S714 RETRIEVE CANDIDATE IMAGE
- S715 CALCULATE GEOMETRIC TRANSFORMATION PARAMETER
- S716 NORMALIZE IMAGE
- S717 EXTRACT ADDITIONAL FEATURE
- S718 VERIFY ADDITIONAL FEATURE
- S719 CALCULATE GENERAL SIMILARITY
- S720 OUTPUT RETRIEVAL RESULT
- END

F I G. 9
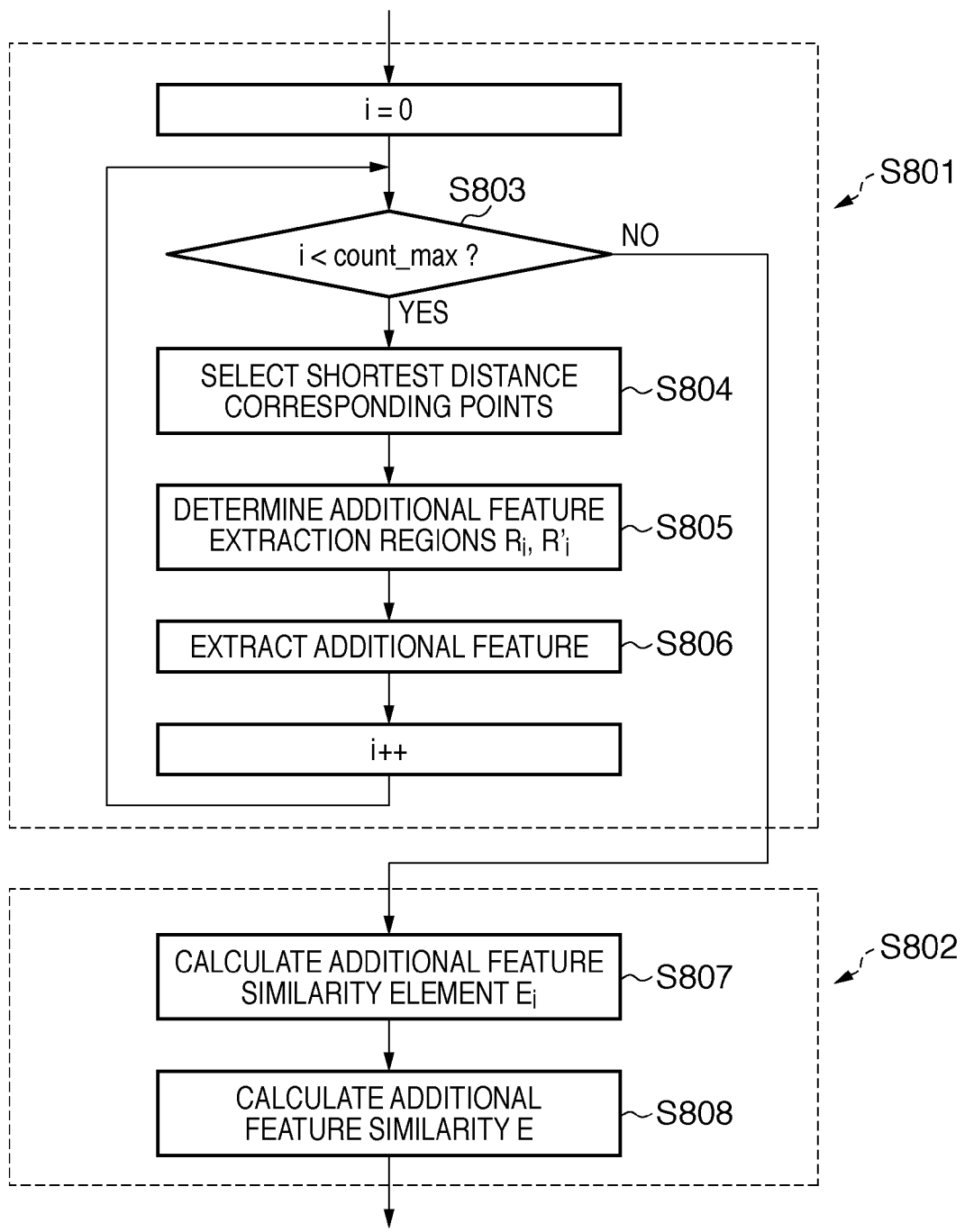

IMAGE RETRIEVAL APPARATUS, CONTROL METHOD FOR THE SAME, AND STORAGE MEDIUM

BACKGROUND OF THE INVENTION

1. Field of the Invention

The present invention relates to an image retrieval apparatus, a control method for the same, and a computer-readable storage medium.

2. Description of the Related Art

Many techniques for retrieving similar images have been proposed. First, there are methods for retrieving similar images using an overall feature amount (global feature amount) of an image. For example, a method has been proposed in which similar images are retrieved utilizing color position information by dividing an image into a plurality of blocks and performing pattern matching using a representative color of each block (Japanese Patent Laid-Open No. 8-249349 (Patent Document 1)). Alternatively, there is also a method in which an image is divided into a plurality of blocks, a feature amount of each block is calculated, and labels according to the feature amounts are given so as to generate a label matrix, which is used as a global feature amount, and similar images are retrieved using the global feature amount (Japanese Patent Laid-Open No. 10-260983 (Patent Document 2)).

Second, methods for retrieving similar images using a localized feature amount (local feature amount) of an image have been proposed. According to these methods, a feature point (local feature point) is first extracted from the image. Next, a feature amount (local feature amount) for the local feature point is calculated from the local feature point and image information in the vicinity thereof. Retrieval of an image is performed by matching local feature amounts.

In the technique using local feature amounts as described above, a method has been proposed in which retrieval is possible even if an image is rotated or enlarged/reduced, by defining a local feature amount as an amount constituted from a plurality of elements that are rotation invariant and enlargement/reduction invariant (C. Schmid and R. Mohr, "Local grayvalue invariants for image retrieval," IEEE Trans. PAMI., Vol. 19, No. 5, pp. 530-534, 1997) (Non-Patent Document 1)).

However, in the case of methods in which a feature is calculated for each of the blocks into which an image has been divided, and retrieval is performed using features of the entire image (global feature method) as disclosed in Patent Documents 1 and 2, a feature amount will be calculated from an entire query image when performing retrieval. With such methods, there is a problem that retrieval becomes difficult, because the global feature amount changes in the case where, for example, a specific object in an image is clipped, the image is rotated at an arbitrary angle, or the background color of the image is changed.

Further, in the case of a retrieval method using a local feature amount (local feature method), generally, retrieval results are output based on the number of matches between local features or a matching rate thereof. Therefore, there is a problem in that if the number of extracted local feature points is too small, accurate retrieval is often impossible because the number of matches is too small or one incorrect correspondence greatly influences the matching rate.

On the other hand, if the number of local feature points is too large, there is a high possibility of including many unstable local feature points whose reproducibility is low, such as those that may disappear by slightly rotating or enlarging/reducing an image. Such unstable local feature points not only cannot be utilized for image retrieval, but also act as noise, which is the cause of a decrease in the retrieval accuracy.

For that reason, with the method disclosed in Non-Patent Document 1, more stable local feature points are selected by proving a threshold value for the output of a function value utilized when extracting local feature points, so as to discard a local feature point whose value is smaller than or equal to the threshold value, although this is not sufficient.

Furthermore, in addition to the problems in connection with each of the above methods, when the local feature method is added to the existing retrieval system based on the global feature method, obtaining an effect comparable to the cost of adding the local feature method is also a problem.

SUMMARY OF THE INVENTION

The present invention provides a technique for preventing a decrease in the retrieval accuracy if the number of local feature points is not appropriate, while enabling retrieval of a rotated image and a clipped image, for example.

According to one aspect of the present invention, there is provided an image retrieval apparatus, comprising: an extraction unit configured to extract a local feature amount, which is a localized feature amount, from an input image; a retrieval unit configured to calculate a local feature similarity, which is a similarity between the extracted local feature amount and a local feature amount of each image registered in an image feature database, and acquire a plurality of candidate images based on the calculated local feature similarity; a parameter calculation unit configured to calculate a geometric transformation parameter between each candidate image and the input image using the extracted local feature amount; a determination unit configured to determine a calculation region on the input image corresponding to a global feature amount calculation region calculated in advance with respect to each candidate image, using the geometric transformation parameter; a feature amount calculation unit configured to calculate a global feature amount in the calculation region determined by the determination unit; a similarity calculation unit configured to calculate a similarity between each candidate image and the input image by comparing the global feature amount of each candidate image and the global feature amount of the input image; and an output unit configured to output each candidate image in order of similarity.

Further features of the present invention will become apparent from the following description of exemplary embodiments with reference to the attached drawings.

BRIEF DESCRIPTION OF THE DRAWINGS

FIGS. 1A and 1B are block diagrams showing example configurations of an image registration apparatus and an image retrieval apparatus of an embodiment.

FIG. 3 is a flowchart showing image retrieval processing of the embodiment.

FIGS. 6A and 6B are block diagrams showing example configurations of an image registration apparatus and an image retrieval apparatus of the embodiment.

FIGS. 7A and 7B are flowcharts showing image registration processing and image retrieval processing of the embodiment.

FIG. 9 is a flowchart showing additional feature extraction processing and additional feature verification processing of the embodiment.

DESCRIPTION OF THE EMBODIMENTS

An image retrieval apparatus according to the present embodiment is configured such that the global feature method and the local feature method can complement each other. Specifically, after acquiring a retrieval result candidate using the local feature method, a global feature that has already been registered in a database is further verified, with regard to the retrieval result candidate image. Note that a verification position of the global feature is estimated using a local feature. Embodiments that realize the basic concepts of the present invention are described in detail below.

In the description of the embodiments below, a feature amount used in the retrieval method using the features of the entire image as disclosed in Patent Documents 1 and 2 is referred to as a "global feature", and the retrieval method using the features of the entire image is referred to as a "global feature method". On the other hand, a feature amount used in the retrieval method using a localized feature of an image is referred to as a "local feature", and the retrieval method using a localized feature of an image is referred to as a "local feature method". Note that in the embodiments, to simplify the description, global features that are calculated and registered in a database (DB) are assumed to be the average values of R, G, and B elements.

Figure 1B:
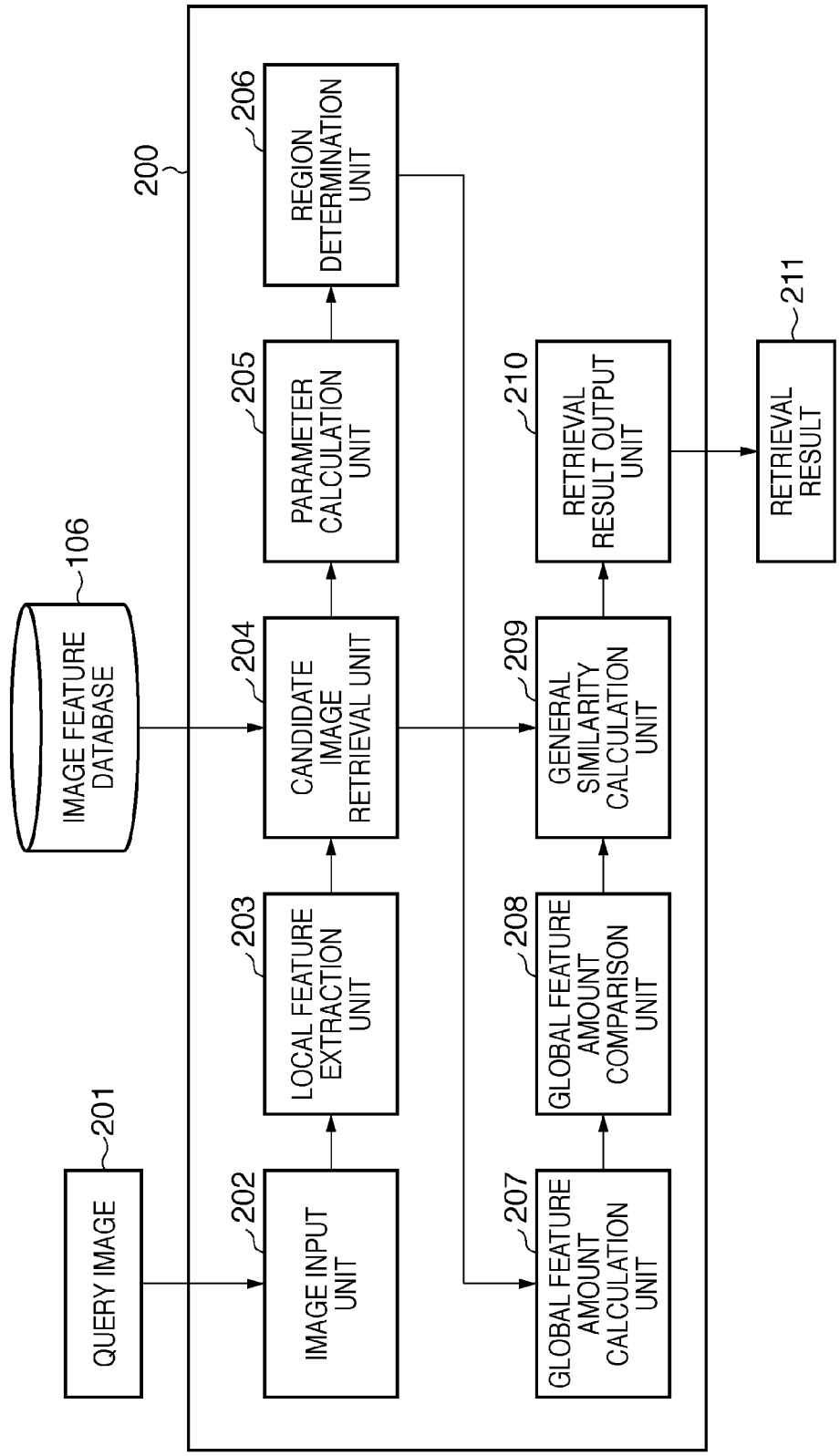

FIG. 1A is a block diagram showing an example configuration of an image registration apparatus 100 of the present embodiment. Reference numeral 106 denotes an image feature database, and image features extracted from a registration target image 101 are registered therein by the registration apparatus 100. FIG. 1B is a block diagram showing an example configuration of an image retrieval apparatus 200 of the present embodiment. An image similar to a query image 201 is retrieved from the image feature database 106. Reference numeral 211 denotes a retrieval result, which includes an image output as a result of retrieval from the image feature database 106 performed by the image retrieval apparatus 200, and association information on that image. Below, an example operation performed by the image retrieval apparatus according to the present embodiment is described.

Image Registration Processing

A procedure of image registration processing is described with reference to the flowchart in FIG. 2. First, an image input unit 102 reads the registration target image 101 (S301). Next, a local feature extraction unit 103 extracts local feature points from the registration target image 101 (S302). Next, a local feature amount is calculated using neighboring pixel values for each of the extracted feature points (S303). Note that with regard to the method for extracting local feature points and the method for calculating feature amounts, various methods including the method disclosed in Non-Patent Document 1 have been proposed, and these existing methods can be utilized.

Figure 4A:
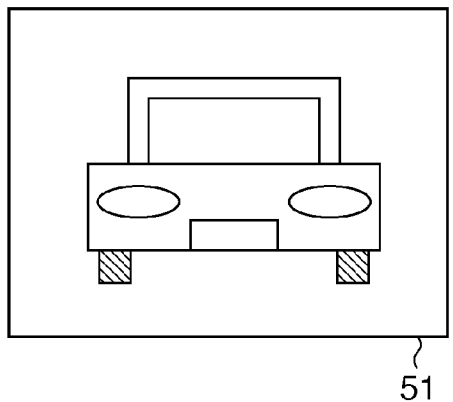
FIGS. 4A to 4D are diagrams illustrating image block division processing, and input image global feature region determination processing of the embodiment.
Figure 4B:
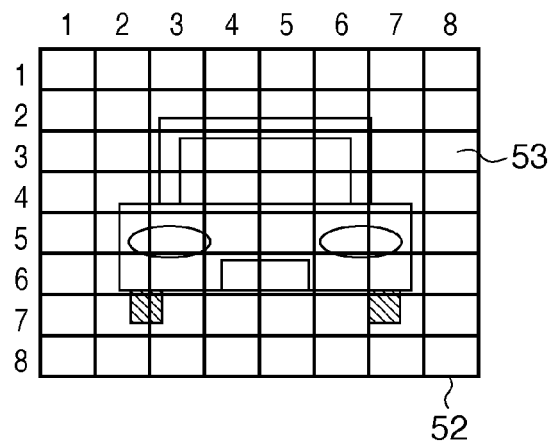

On the other hand, a global feature extraction unit 104 divides the registration target image 101 into blocks (S304). Here, FIGS. 4A and 4B are diagrams showing an example of dividing an image into blocks. In the description of the present embodiment, as shown in FIG. 4B, a description is given assuming that the registration target image 101 is divided into 8×8 small blocks. Reference numeral 51 in FIG. 4A denotes a registration target image, and reference numeral 52 in FIG. 4B denotes a post-division registration target image showing the registration target image 51 having been divided into blocks. Furthermore, to facilitate description, numbers are given to the blocks of the post-division registration target image in the vertical and horizontal directions, for the purpose of specifying a post-division block position. For example, the position of a post-division block 53 is expressed as (8, 3) using the numbers.

After that, for each post-division block, average values Rs, Gs, and Bs of the R, G, and B elements are calculated using the pixel values in the block (S305). Next, the R, G, and B average values calculated for each block are summed, and the resultant value is used as a global feature amount (S306). Here, a global feature amount is configured such that the R, G, and B average values that are assigned to each block can be referenced. For example, a configuration may be adopted in which R, G, and B average values are simply arranged in a specific order, or a label matrix may be further generated, and the label matrix may also be included, as disclosed in Patent Document 2.

A feature amount registration unit 105 configures the local feature amount calculated in step S303 and the global feature amount acquired in step S306 in a feature amount expression form that is registrable in the image feature database 106, and registers the feature amount expressions in the image feature database 106 (S307).

Image Retrieval Processing

Next, a procedure of image retrieval processing is described with reference to the flowchart in FIG. 3. First, an image input unit 202 shown in FIG. 1B reads the query image 201 (S401). A local feature extraction unit 203 extracts local feature points from the query image 201 using the same method as that for image registration processing (S402). Next, a local feature amount is calculated using neighboring pixel values for each of the feature points extracted in step S402 (S403). Note that with regard to the method for extracting local feature points and the method for calculating feature amounts, various methods including the method disclosed in Non-Patent Document 1 have been proposed, and these existing methods can be utilized.

A candidate image retrieval unit 204 searches the image feature database 106 using the calculated local feature amount, and acquires, as retrieval result candidate images, a predetermined number of images in order of similarity from the top retrieval result (S404). Note that in the present embodiment, this similarity is referred to as "local feature similarity". The local feature similarity is expressed using real numbers in a range of 0 to 1. Note that retrieval result candidate images are delivered to a parameter calculation unit 205, and the local feature similarity is delivered to a general similarity calculation unit 209.

The parameter calculation unit 205 calculates a geometric transformation parameter between the query image 201 and each retrieval result candidate image (S405). Geometric transformation parameters include an image rotation angle and enlargement/reduction rate, for example.

In an often used method for calculating geometric transformation parameters, first, a list of combinations (corresponding points) of local feature points in a query image (query feature points), and local feature points in a sample image (sample feature points) corresponding to the local feature points is created. Here, corresponding points are normally extracted as a combination with the shortest inter-feature amount distance between a local feature amount in the query feature point and a local feature amount in the sample feature point that is less than or equal to a predetermined threshold value. Next, a transformation matrix is set as a geometric transformation parameter by sequentially selecting several sets of corresponding points from the corresponding points list, and finding a transformation matrix that, for each set of corresponding points, successfully transforms local feature point coordinates in the sample image into local feature point coordinates in the query image. Although the number of corresponding points to be selected differs depending on the assumed geometric transformation, two sets are selected in the case of the assumed similarity transformation in the present embodiment. In fact, the above corresponding points include incorrect corresponding points (outliers).

For that reason, every time a geometric transformation parameter is calculated, that geometric transformation parameter is used to check, for all the corresponding points, whether the local feature point coordinates in the sample image are transformed into the local feature point coordinates in the corresponding query image, and the checking results are recorded. Checking is performed by obtaining an average coordinate distance between the local feature point coordinates in the sample image after transformation and the local feature point coordinates in the query image, with the transformation result being better the shorter average distance between coordinates. The checking results of all the geometric transformation parameters are examined, and the geometric transformation parameter with the best transformation result is adopted.

In the present embodiment, when calculating a geometric transformation parameter, the RANSAC technique is used in order to reduce the calculation amount. With RANSAC, corresponding points are randomly selected from the above corresponding points list, rather than being sequentially selected. Although the number of selections is determined in advance with consideration given to the proportion of outliers, the number of selections is set to approximately 50 to 100 in the present embodiment. Every time corresponding points are selected, a transformation matrix that, for the selected corresponding points, transforms the local feature point coordinates in the sample image into the local feature point coordinates in the query image is calculated. Similar to the above, every time a geometric transformation parameter is calculated, it is checked, for all the corresponding points, whether the local feature point coordinates in the sample image transform into the corresponding local feature point coordinates in the query image, and the checking results are recorded. The checking results of all the geometric transformation parameters are examined, and the geometric transformation parameter with the best transformation result is adopted.

Figure 5:
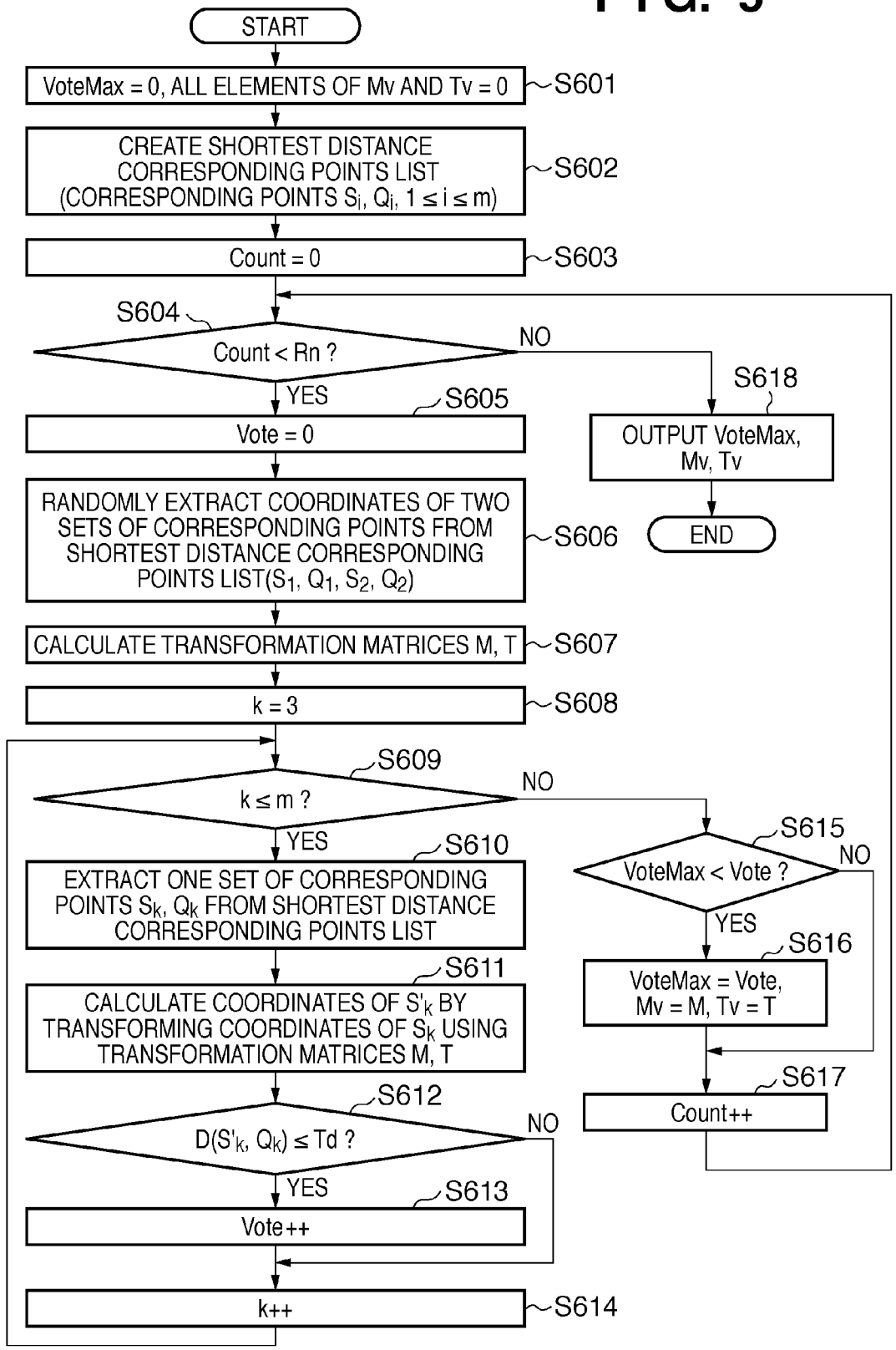
FIG. 5 is a flowchart showing a procedure for calculating a geometric transformation parameter.

An example of the geometric transformation parameter calculation in step S405 in the case where the geometric transformation is a similarity transformation is shown in FIG. 5. FIG. 5 is a flowchart showing a procedure for calculating a geometric transformation parameter. In FIG. 5, the local feature amount extracted from the query image 201 is Vq, the local feature point associated with that local feature amount is Q, and the coordinates of that local feature point are Q(x', y').

Further, the local feature amount that exists on a retrieval result candidate image R is Vs, the local feature point associated with that local feature amount is S, and the coordinates thereof are S(x, y).

First, a variable VoteMax representing the final number of votes is initialized to 0, and all the elements of final transformation matrices My and Tv are set to 0 (S601). Next, the inter-feature amount distance between Vq and Vs is calculated for all the combinations, and a list of shortest distance corresponding points is created (S602). Specifically, a combination of Vq and Vs (corresponding points) with the shortest calculated inter-inter-feature amount distance less than or equal to a predetermined threshold value is extracted and registered in the shortest distance corresponding points list. Below, in the description of the present embodiment, with regard to the kth set of corresponding points registered in the shortest distance corresponding points list, the local feature amounts of the corresponding points are respectively expressed as Vq(k) and Vs(k), the local feature points associated with Vq(k) and Vs(k) are respectively expressed as $Q_k$ and $S_k$, and the coordinates thereof are respectively expressed as $Q_k(x'_k, y'_k)$, $S_k(x_k, y_k)$, for instance, with the addition of subscripts. Further, the number of sets of corresponding points that are registered in the shortest distance corresponding points list created in step S602 is assumed to be m.

Next, a variable Count that represents the number of repetition counts is initialized to 0 (S603). Next, it is determined whether the number of repetition counts Count has not exceeded a predetermined maximum number of repeated processing Rn (S604). If it is greater than or equal to Rn, the processing ends after outputting the final number of votes VoteMax, and the final transformation matrices My and Tv in step S618. If not in excess, the processing proceeds to step S605.

In step S605, a variable Vote that represents the number of votes is initialized to 0. Next, coordinates of two sets of corresponding points are randomly extracted from the shortest distance corresponding points list (S606). In the present embodiment, these coordinates are expressed as $Q_1(x'_1, y'_1)$, $S_1(x_1, y_1)$, and $Q_2(x'_2, y'_2)$, $S_2(x_2, y_2)$. Next, assuming that the extracted $Q_1(x'_1, y'_1)$, $S_1(x_1, y_1)$ and $Q_2(x'_2, y'_2)$, $S_2(x_2, y_2)$ satisfy the transformation shown by Equation (1), variables a to f in Equation (1) are derived (S607). Note that in step S607 in the flowchart shown in FIG. 5, a matrix constituted from the variables a to d is expressed as M, and a matrix constituted from the variables e to f is expressed as T.

$$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \quad (1)$$

Here, in the present embodiment, only similarity transformation is considered in order to simplify the description. At this time, Equation (1) can be rewritten as Equation (2).

$$\begin{pmatrix} x'_k \\ y'_k \end{pmatrix} = \begin{pmatrix} a & -b \\ b & a \end{pmatrix} \begin{pmatrix} x_k \\ y_k \end{pmatrix} + \begin{pmatrix} e \\ f \end{pmatrix} \quad (2)$$

At this time, the variables a, b, e and f are expressed by Equations (3) to (6) using $x'_1, y'_1, x_1, y_1, x'_2, y'_2, x_2$, and $y_2$.

$$a = \frac{(x_1 - x_2)(x'_1 - x'_2) + (y_1 - y_2)(y'_1 - y'_2)}{(x_1 - x_2)^2 + (y_1 - y_2)^2} \quad (3)$$

$$b = \frac{(x_1 - x_2)(y'_1 - y'_2) - (y_1 - y_2)(x'_1 - x'_2)}{(x_1 - x_2)^2 + (y_1 - y_2)^2} \quad (4)$$

$$e = \frac{(y'_1 - y'_2)(x_1 y_2 - x_2 y_1) - (x'_1 + x'_2)(x_1 x_2 + y_1 y_2) +}{x'_1(x_2^2 + y_2^2) + x'_2(x_1^2 + y_1^2)} \quad (5)$$

$$f = \frac{(x'_1 - x'_2)(y_1 x_2 - y_2 x_1) - (y'_1 + y'_2)(y_1 y_2 + x_2 x_2) +}{y'_1(y_2^2 + x_2^2) + y'_2(y_1^2 + x_1^2)} \quad (6)$$

Next, in order to select points other than the two sets of points randomly extracted from the shortest distance corresponding points list in step S606, a corresponding point selection variable k is initialized to 3 (S608). Next, it is determined whether the corresponding point selection variable k does not exceed the number of sets m of corresponding points that are registered in the shortest distance corresponding points list (S609). If in excess, the processing proceeds to step S615, which will be described later. If it is determined in step S609 that the corresponding point selection variable k is smaller than or equal to the number of sets m of corresponding points that are registered in the shortest distance corresponding points list, the processing proceeds to step S610.

In step S610, a point other than the points $S_1$ ($x_1$, $y_1$) and $S_2(x_2, y_2)$ of the two sets of points that were randomly extracted from the shortest distance corresponding points list in step S606 is extracted from the shortest distance corresponding points list. In the present embodiment, the extracted point is expressed as $S_k(x_k, y_k)$.

Next, coordinates $S_k'(x'_k, y'_k)$ to which $S_k(x_k, y_k)$ is moved are derived using Equation (2) (S611). After that, the geometric distance between coordinates $S_k'(x'_k, y'_k)$ and coordinates $Q_k(x'_k, y'_k)$ is calculated using Euclidean distance, and it is determined whether the Euclidean distance is a threshold value Td or less (S612). If the Euclidean distance is the threshold value Td or less, the number of votes Vote is incremented in step S613, and the processing proceeds to step S614. If the Euclidean distance is greater than the threshold value Td, the processing proceeds to step S614, without performing any processing. In step S614, the corresponding point selection variable k is incremented, and the processing returns to step S609.

Next, a description is given with regard to step S615, which is processing performed in the case where the corresponding point selection variable k exceeds the number of sets m of corresponding points registered in the shortest distance corresponding points list in step S609. In step S615, the value of the number of votes Vote is compared with the value of the final number of votes VoteMax, and if the value of the number of votes Vote is greater than the value of the final number of votes VoteMax, the processing of step S616 is executed. In step S616, the value of the final number of votes VoteMax is replaced by the value of the number of votes Vote, and thereafter the final transformation matrices My and Tv are respectively set for the transformation matrices M and T obtained in step S607. The number of repetition counts Count is incremented in step S617, and the processing returns to step S604. The value of the number of votes Vote is compared with the value of the final number of votes VoteMax, and if the value of the number of votes Vote is smaller than or equal to the value of the final number of votes VoteMax, the number of repetition counts Count is incremented in step S617, and the processing returns to step S604.

Note that in the description of a method for calculating the similarity in the present embodiment, although a description has been given considering only a similarity transformation, it is possible cope with other geometrical transformations such as an affine transformation by deriving a transformation matrix according to each geometrical transformation in step S607. For example, in the case of an affine transformation, first, the coordinate number of a set of corresponding points randomly selected in step S606 is set to 3. Next, Equation (1) rather than Equation (2) is used in step S607, and the variables a to f may be derived using the three sets of corresponding points (six points in total) selected in step S606.

Next, in step S406, a region determination unit 206 determines, for each block set when the retrieval result candidate image was registered, a corresponding region on the query image 201 as a global feature amount calculation region of an input image. A geometric transformation parameter is utilized to determine a global feature amount calculation region of the input image. A condition for determining the global feature amount calculation region of the input image in the present embodiment is that the calculation region does not extend beyond the input image. For that reason, the number of global feature amount calculation regions of the input image to be determined may be plural or even zero.

Figure 4C:
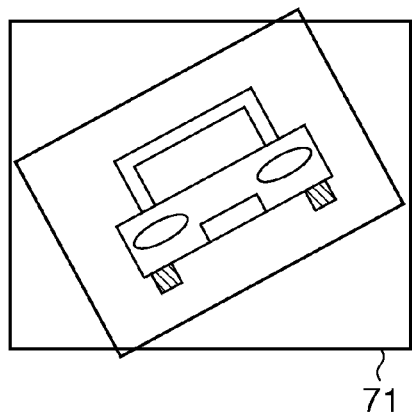
Figure 4D:
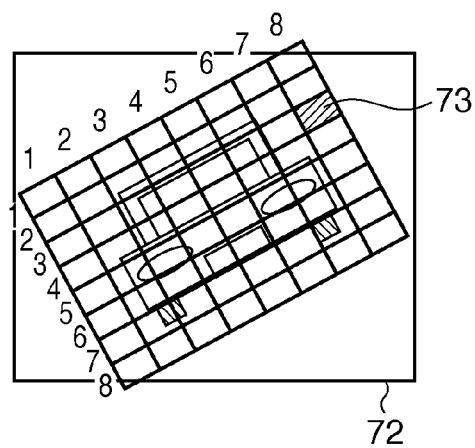

FIGS. 4C and 4D are diagrams illustrating input image global feature region determination processing in step S406. Reference numeral 71 in FIG. 4C denotes a query image, and reference numeral 72 in FIG. 4D represents global feature amount calculation regions of an input image corresponding to the blocks of the registration target image 51 having been superimposed on the query image 71 using a geometric transformation parameter. The block 53 in the position (8, 3) in FIG. 4B corresponds to a division block 73 in the position (8, 3) on the query image, among the blocks superimposed on the query image 201. Therefore, the block 73 is a global feature amount calculation region of the input image corresponding to the block 53.

A global feature amount calculation unit 207 calculates the same global feature amount at the time of registration for each global feature amount calculation region on the query image 201 (S407). With the image registration processing of the present embodiment, since the global feature amount is described as R, G, and B element average values of the pixel values in a region, average values $R_q$, $G_q$, and $B_q$ of R, G, and B elements are also calculated in step S407 from the pixel values in the global feature amount calculation region on the query image 201. Note that in the present embodiment, if a portion of a global feature amount calculation region of the input image extends beyond the query image 201, the global feature of that region is not calculated, and this fact is recorded for when processing is subsequently performed, in a manner that makes it apparent that the region extends beyond the image.

A global feature amount comparison unit 208 compares, for each retrieval result candidate image, the average values of R, G, and B elements of each global feature amount calculation region of the query image, and each block on the retrieval result candidate image corresponding to each global feature amount calculation region of the input image (S408). The comparison results are generated as numerical comparison results by being numerically expressed. In the present embodiment, the absolute difference value of the average values of R, G, and B elements is calculated for each global feature amount calculation region of the input image, and the average of the absolute difference values is used as the numerical comparison result. Specifically, the numerical comparison result E can be derived using Equation (7). Note that the number of global feature amount calculation regions of the input image is set to N. Further, the average values of R, G, and B elements of a block corresponding to a calculation region i of the global feature amount of a retrieval result candidate image are $R_s(i)$, $G_s(i)$, and $B_s(i)$, respectively. Further, the average values of R, G, and B elements of a calculation region i of the global feature amount of a query image are $R_q(i)$, $G_q(i)$, and $B_q(i)$, respectively.

$$E = \frac{1}{3N} \sum_{i=1}^{N} (|R_s(i) - R_q(i)| + |G_s(i) - G_q(i)| + |B_s(i) - B_q(i)|) \quad (7)$$

The general similarity calculation unit 209 calculates a general similarity using the local feature similarity delivered from the candidate image retrieval unit 204, and the numerical comparison result calculated in step S408 (S409). In the present embodiment, a general similarity is calculated using Equation (8). Note that $S_t$ is the general similarity, $S_p$ is the local feature similarity, and E is the numerical comparison result. Here, the local feature similarity is $-1.0 \leq S_p \leq 2.0$.

$$S_t = S_p + \frac{128 - E}{128} \quad (8)$$

A retrieval result output unit 210 outputs a retrieval result candidate image as a retrieval result 211 in order of general similarity (S410).

Figure 2:
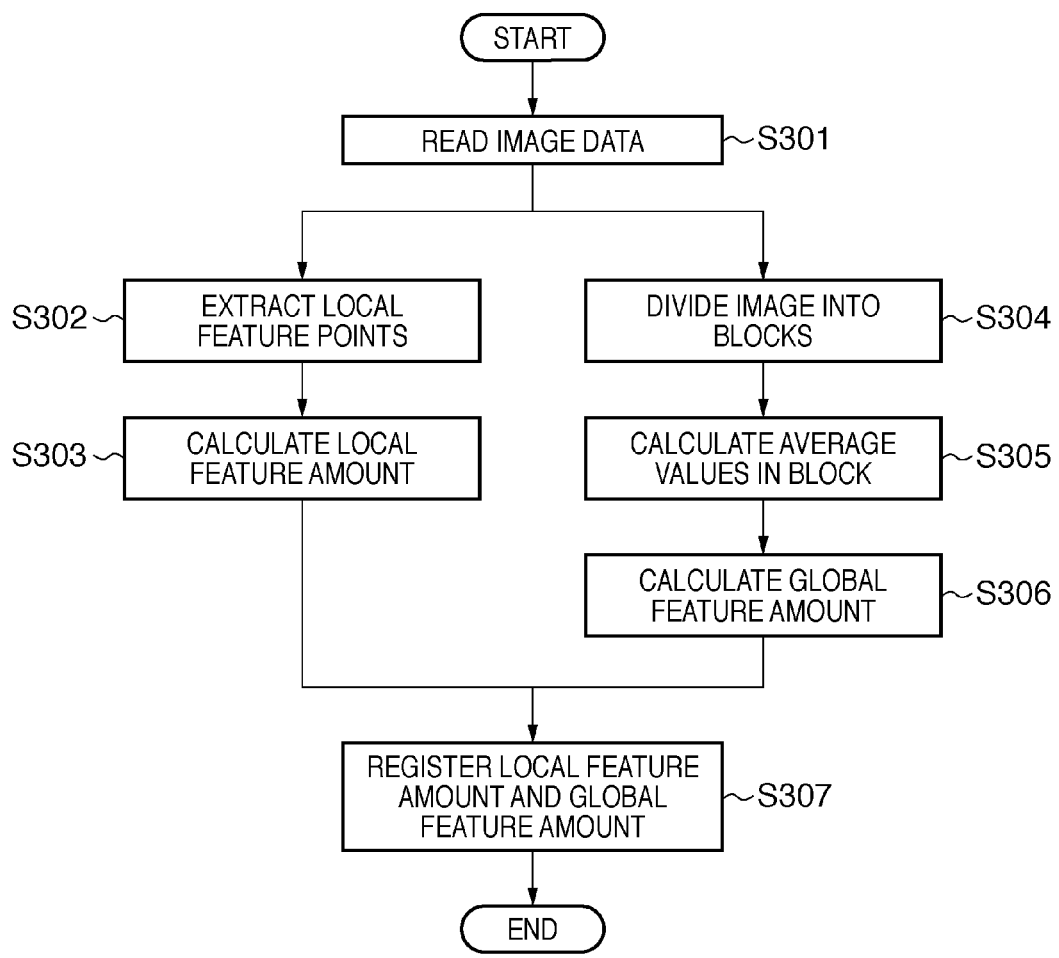
FIG. 2 is a flowchart showing image registration processing of the embodiment.

In the embodiment described above, in FIG. 1A, the local feature extraction unit and the global feature extraction unit are constituted so as to perform processing in parallel, and FIG. 2 illustrates that processing is performed in parallel in a local feature amount calculation step portion and a global feature amount calculation step portion. However, instead, a configuration may be adopted in which the local feature extraction unit and the global feature extraction unit are constituted in series, and processing is performed in series in the local feature amount calculation step portion and the global feature amount calculation step portion.

Further, in the embodiment described above, although a configuration is adopted in which a global feature amount and a local feature amount are simultaneously generated at the time of registration, a global feature and a local feature may be created at a different timing. For example, if a retrieval system already configured using the global feature amount exists, a configuration is possible in which only a local feature amount is calculated, and additionally registered.

Furthermore, in the embodiment described above, a method for calculating the average values of R, G, and B elements for each block is described as an example of global feature amount calculation. However, it is sufficient to adopt a configuration such that specific information can be held and referenced for each block, and a luminance average value may be given as specific information, or statistical information such as pixel value variance, coefficient information after frequency transformation, or the like may be given.

Furthermore, in the embodiment described above, an example of calculating a global feature amount after dividing an image into blocks is described. However, if it is possible to, after dividing an image into partial regions, hold/reference information in each of the partial regions, it is not necessary to divide the image into blocks, and instead of blocks, arbitrary regions, such as circular regions or elliptic regions, may be constituted.

Furthermore, although it is described that the numerical comparison result E is calculated using Equation (7) and the general similarity is calculated using Equation (8), the present invention is not limited to use of these equations. It is also possible to replace the equations by other equations, as long as they are equations for calculating a numerical comparison result and a general similarity for which the comparison result of global features is appropriately reflected in the general similarity, for example.

Furthermore, although the global feature amount has been described as R, G, and B element average values of the pixel values in a region, the global feature amount is not limited to this, and any amount can be used as long as the amount can be compared. For example, other statistical information such as a variance value may be used as a global feature amount, or vectors may be configured by arranging the pixel values in a region in one line in accordance with the regulation determined in advance.

Furthermore, as the comparison method and comparison result in step S408, a method has been described in which an absolute difference value between the average values of R, G, and B elements is calculated for each global feature amount calculation region of the input image, and the average of the absolute difference values is calculated. However, a configuration may be adopted in which a comparison result is output using other comparison methods. For example, a configuration may be adopted in which a correlation between global feature amounts is examined, and a correlation coefficient is used as a comparison result.

As is clear from the above description, an image retrieval apparatus according to the present embodiment acquires a retrieval result candidate image using the local feature method, and thereafter further verifies a global feature with regard to the retrieval result candidate image. Thereby, while enabling retrieval of a rotated image and a clipped image, it is possible to prevent a decrease in the retrieval accuracy also at the time of retrieval of an image for which the retrieval accuracy decreases if the retrieval is performed using only the local feature method.

Furthermore, when the local feature method is added to the existing retrieval system based on the global feature method, it is possible not only to utilize the existing feature amount, but also take advantage of the existing feature amount for the improvement in retrieval accuracy, and thus it is possible to obtain an effect comparable to the cost of adding the local feature method.

Furthermore, a control step of controlling whether or not to execute the processing of steps S405 to S409 (global feature comparison processing) based on the local feature similarity may be provided.

Further, a configuration may be adopted in which global feature comparison processing is only executed in the case where the maximum value of the local feature similarity is smaller than a predetermined threshold value.

Further, a configuration may be adopted in which the ratio of the maximum value and second greatest value of the local feature similarity is calculated, and global feature comparison processing is only executed in the case where this ratio is smaller than a predetermined threshold value.

Further, a configuration may be adopted in which global feature comparison processing is only executed in the case where the maximum value of the local feature similarity is smaller than a first threshold value, and furthermore where the ratio of the maximum value and second greatest value of the local feature similarity is calculated, and this ratio is smaller than a second threshold value.

Further, after determining a global feature amount calculation region, it may be determined by checking information for each calculation region whether or not to compare the global feature amount of the input image with the global feature amounts of candidate images. If it is determined not to perform comparison, processing from steps S408 to S409 may be skipped with regard to that calculation region.

Further, when determining whether or not to perform global feature amount comparison, edge detection may be performed, and the processing from steps S408 to S409 may be skipped with regard to calculation regions where an edge exists.

Further, when performing edge detection, gradient amplitude values of pixel values in a calculation region may be calculated, and only pixels for which the gradient amplitude value is greater than or equal to a predetermined threshold value may be output as extracted edges.

Furthermore, the maximum value of an amplitude value may be calculated, and only pixels for which it is possible to calculate a gradient amplitude value whose ratio relative to the maximum value is greater than or equal to a predetermined threshold value may be output as edges.

Further, a conjoined calculation region may be generated by conjoining a plurality of global feature amount calculation regions on an input image, a global feature amount may be calculated in the conjoined calculation region as a conjoined global feature amount, and the conjoined global feature amount of a candidate image and the conjoined global feature amount of an input image may be compared.

Further, it may be a condition that the calculation regions utilized to generate a conjoined calculation region adjoin each other.

Further, after determining global feature amount calculation regions, image processing (Fourier transform or discrete cosine transform) may be performed on each calculation region, and a global feature may be calculated from the calculation region after image processing.

FIG. 6A is a block diagram showing an example configuration of an image registration apparatus 600 of the present embodiment. Reference numeral 11 denotes a registration target image, which is an image to be registered in an image feature database described later. Reference numeral 17 denotes an image feature database, where the image registration apparatus 600 registers an image feature extracted from the registration target image 11.

FIG. 6B is a block diagram showing an example configuration of an image retrieval apparatus 700 of the present embodiment. Reference numeral 21 denotes a query image (input image), and an image similar to the query image 21 is retrieved from the image feature database 17. Reference numeral 31 denotes a retrieval result, which includes an image output as a result of retrieval from the image feature database 17 performed by the image retrieval apparatus 700, and information associated with the image. Below is a description of example operations performed by the image registration apparatus 600 and the image retrieval apparatus 700 according to the present embodiment.

Image Registration Processing

A procedure of image registration processing is described with reference to the flowchart in FIG. 7A. First, an image input unit 12 reads the registration target image 11 (S701, and a luminance component image is generated by extracting a luminance component from the registration target image 11 (S702). This luminance component image is delivered to a reduced image generation unit 13 and a feature amount registration unit 16.

Next, the reduced image generation unit 13 generates n reduced images by sequentially reducing the luminance component images delivered from the image input unit 12 in accordance with a magnification p, and delivers the reduced images to a local feature point extraction unit 14 (S703). The magnification p and the number of reduced images n are determined in advance. A reduced image is generated by a reduction method using linear interpolation, for example.

Next, the local feature point extraction unit 14 extracts a localized feature point (local feature point) that is robustly extracted even if the image is rotated, from each of the n reduced images delivered from the reduced image generation unit 13 (S704). The extracted local feature point is delivered to a local feature amount calculation unit 15. Here, in the present embodiment, as a method for extracting a local feature point, the Harris operator is used, as described in C. Harris and M. J. Stephens, "A combined corner and edge detector", In Alvey Vision Conference, pages 147-152, 1988 (Non-Patent Document 2), for example. Specifically, with regard to a pixel on an output image H obtained by operating the Harris operator, pixel values of that pixel and eight pixels neighboring the pixel (nine pixels in total) are examined. Then, a point where the pixel is the local maximum (the pixel value of that pixel is the maximum among the nine pixels) is extracted as a local feature point. At this time, even when the pixel is the local maximum, if the value of that pixel is smaller than or equal to a threshold value, the point is not extracted as a local feature point. Note that the method is not limited to the feature point extraction method used in the present embodiment, and the local feature point extraction unit 14 can adopt any feature point extraction method as long as it is a method according to which a local feature point can be extracted.

Next, the local feature amount calculation unit 15 calculates a feature amount (local feature amount) that is defined as being constant even if an image is rotated, for each local feature point delivered from the local feature point extraction unit 14 (S705). The extracted local feature amount is delivered to the feature amount registration unit 16 after being associated with coordinate information. A method for calculating a local feature amount is assumed to comply with a method described in Local Jet (J. J. Koenderink and A. J. van Doorn, "Representation of local geometry in the visual system", Biological Cybernetics, vol. 55, pp. 367-375, 1987 (Non-Patent Document 3), for example, and a combination of these derivatives is used. Specifically, the local feature amount shown by Equation (9) is calculated.

$$v = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (9)$$

Note that the symbols used on the right hand side of Equation (9) are defined by Equations (10) to (15) shown below. Here, on the right-hand side of Equation (10), G(x, y) is a Gaussian function, I(x, y) is a pixel value of the coordinates (x, y) of an image, and "*" is a symbol representing a convolution operation. Further, Equation (11) is a partial derivative of a variable L with respect to x defined by Equation (10), and Equation (12) is a partial derivative of the variable L with respect to y. Equation (13) is a partial derivative of a variable $L_x$ defined by Equation (11) with respect to y, Equation (14) is a partial derivative of the variable $L_x$ defined by Equation (11) with respect to x, and Equation (15) is a partial derivative of a variable $L_y$ defined by Equation (12) with respect to y.

$$L = G(x, y) * I(x, y) \quad (10)$$

$$L_x = \frac{\partial L}{\partial x} \quad (11)$$

$$L_y = \frac{\partial L}{\partial y} \quad (12)$$

$$L_{xy} = \frac{\partial^2 L}{\partial x \partial y} \quad (13)$$

$$L_{xx} = \frac{\partial^2 L}{\partial x^2} \quad (14)$$

$$L_{yy} = \frac{\partial^2 L}{\partial y^2} \quad (15)$$

Note that the method is not limited to the feature amount calculation method used in the present embodiment, and the local feature amount calculation unit 15 can adopt any feature amount calculation method as long as the method enables calculation of a local feature amount.

Next, the feature amount registration unit 16 associates the local feature amount delivered from the local feature amount calculation unit 15, and the registration target image 11 delivered from the image input unit 12, and registers the result in the image feature database 17 (S706). This completes the image registration processing.

Image Retrieval Processing

Next, image retrieval processing is described with reference to the flowchart shown in FIG. 7B. First, an image input unit 22 reads the query image 21 (S711). A local feature extraction unit 23 extracts local feature points from the query image 21 using the same method as that for image registration processing (S712). Next, a local feature amount is calculated using neighboring pixel values for each feature point extracted in step S712 (S713). Note that with regard to the method for extracting local feature points and the method for calculating feature amounts, various methods including the method disclosed in Non-Patent Document 1 have been proposed, and these existing methods can be utilized.

A candidate image retrieval unit 24 calculates a similarity by searching the image feature database 17 using the calculated local feature amount, and acquires a predetermined number of images in order of similarity from the top search result (S714). Note that in the present embodiment, this similarity is referred to as "local feature similarity". The local feature similarity is expressed using the real numbers in the range of 0 to 1. Retrieval result candidate images are delivered to a parameter calculation unit 25, and the local feature similarity is delivered to a general similarity calculation unit 29.

The parameter calculation unit 25 calculates a geometric transformation parameter for geometric transformation between the query image 21 and each retrieval result candidate image (S715). Geometric transformation parameters include the image rotation angle and enlargement/reduction rate, for example. Calculation of a geometric transformation parameter in step S715 can be performed using a similar procedure to that described above with reference to FIG. 5. Note that in the embodiment below, in step S618 in FIG. 5, the shortest distance corresponding points list, and the final transformation matrices Mv and Tv are output.

An image normalization unit 26 generates a normalized retrieval result candidate image by performing normalization so as to match a retrieval result candidate image with a query image using the geometric transformation parameter (S716). As a result of processing performed by the image normalization unit 26, the query image and the normalized retrieval result candidate image will be in a state in which the orientation and scale of the images are normalized. Here, normalization methods include a method for matching a retrieval result candidate image with a query image, a method for matching a query image with a retrieval result candidate image, and a method for matching a query image and a retrieval result candidate image with a predetermined normalized image. In the present embodiment, a description is given assuming that normalization is performed such that a retrieval result candidate image is matched with a query image.

An additional feature extraction unit 27 extracts an additional feature, which is an added feature, from each of the query image 21 and a normalized retrieval result candidate image (S717). The present embodiment describes the additional feature as average values of R, G, and B elements. Note that the additional features are extracted from a region that exists in both of the query image 21 and the normalized retrieval result candidate image. Specifically, the region that extends when the query image and the normalized retrieval result candidate image are aligned and superimposed is excluded from the regions where the additional features are extracted. Here, with regard to average values of R, G, and B elements serving as additional features, the additional features extracted from the query image are $R_q$, $G_q$, and $B_q$, and the additional features extracted from the normalized retrieval result candidate image are $R_s$, $G_s$, and $B_s$.

An additional feature verification unit 28 verifies the additional features of each of the normalized retrieval result candidate images and the query image, and calculates additional feature similarity by numerically expressing the comparison result (S718). In the present embodiment, the additional feature similarity is obtained by calculating the average of the absolute difference values between R, G, and B average values, which serve as the additional features. Specifically, an additional feature similarity E can be obtained using Equation (16).

$$E = \frac{1}{3}(|R_s - R_q| + |G_s - G_q| + |B_s - B_q|) \quad (16)$$

The general similarity calculation unit 29 calculates a general similarity using the local feature similarity delivered from the candidate image retrieval unit 24, and the numerical comparison result calculated in step S718 (S719). In the present embodiment, a general similarity is calculated using Equation (17). Note that $S_t$ is the general similarity, $S_p$ is the local feature similarity, and E is the numerical comparison result. Here, the range of the general similarity $S_t$ is $-1.0 \leq S_p \leq 2.0$.

$$S_t = S_p + \frac{128 - E}{128} \quad (17)$$

A retrieval result output unit 30 outputs a predetermined number of retrieval result candidate images as retrieval results 31 in order of general similarity (S720).

Note that although a description has been given assuming that the additional feature similarity E is expressed by Equation (16), and the general similarity is expressed by Equation (17), equations are not limited to these equations. It is also possible to replace the equations by other equations, as long as the equations are for calculating an additional feature similarity and a general similarity, in which the comparison result of additional features is appropriately reflected in the general similarity.

Furthermore, as the comparison method and verification result in step S718, a method has been described in which an absolute difference value between the average values of R, G, and B elements is calculated, and the average of the absolute difference values is calculated as the additional feature similarity. However, a configuration may be adopted in which the additional feature similarity is output using other comparison methods. For example, a configuration may be adopted in which a correlation between pixel values is examined, and a correlation coefficient is used as a comparison result.

Here, additional feature extraction region determination processing for determining an additional feature extraction region may be added.

Figure 8A:
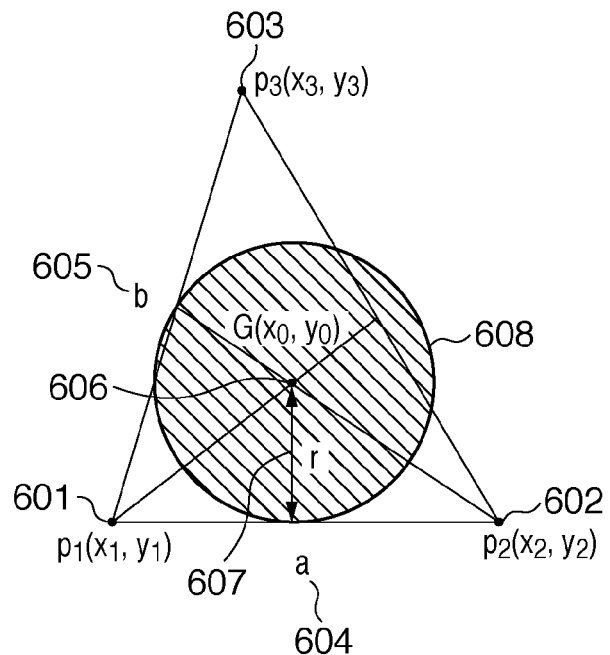
FIGS. 8A and 8B are diagrams showing an example method for determining an additional feature extraction region of a normalized retrieval result candidate image, and an example method for determining an additional feature extraction region of a query image.

FIG. 8A shows an example of a method for determining an additional feature extraction region of a normalized retrieval result candidate image. In FIG. 8A, reference numerals 601, 602, and 603 denote three points on the normalized retrieval result candidate image that have been randomly selected from shortest distance corresponding points when the final number of votes is maximized in the parameter calculation unit 25. For the description below, reference numerals 601, 602, and 603 are described as a point $P_1(x_1, y_1)$, a point $P_2(X_2, y_2)$, and a point $P_3(X_3, y_3)$, respectively. Reference numeral 604 denotes a vector whose starting point is $P_1$ and terminal point is $P_2$. Reference numeral 605 denotes a vector b whose starting point is $P_1$ and terminal point is $P_3$. Reference numeral 606 denotes a center of gravity $G(x_0, y_0)$ calculated from the points $P_1$, $P_2$, and $P_3$. Reference numeral 607 denotes a distance r between the center of gravity G and the vector a. Reference numeral 608 denotes an additional feature extraction region of the normalized retrieval result candidate image, which is a circle of radius r centered on a center of gravity G.

Figure 8B:
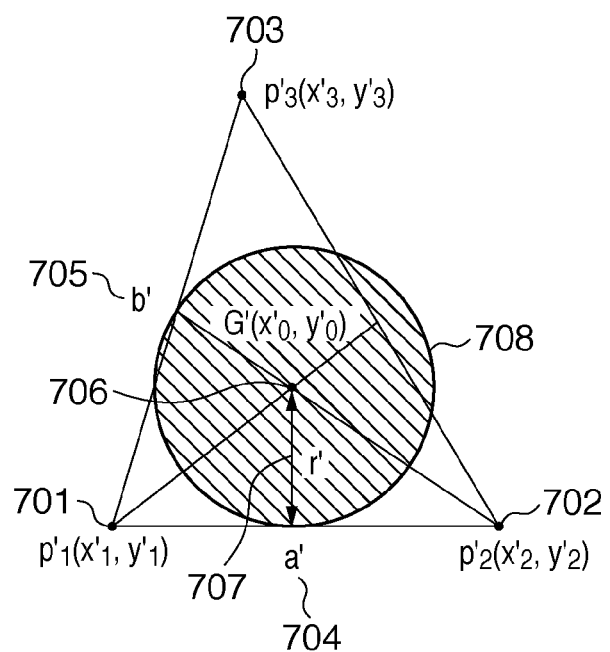

Next, FIG. 8B shows an example method for determining an additional feature extraction region of a query image. In FIG. 8B, reference numerals 701, 702, and 703 denote three points on the query image that have been randomly selected from shortest distance corresponding points when the final number of votes is maximized in the parameter calculation unit 25. For the description below, reference numerals 701, 702, and 703 are described as a point $P_1(x'_1, y'_1)$, a point $P'_2(X'_2, y'_2)$, and a point $P'_3(X'_3, y'_3)$, respectively. Reference numeral 704 denotes a vector a' whose starting point is $P'_1$ and terminal point is $P'_2$. Reference numeral 705 denotes a vector b' whose starting point is $P'_1$ and terminal point is $P'_3$. Reference numeral 706 denotes a center of gravity $G'(x'_0, y'_0)$ calculated from the points $P'_1$, $P'_2$, and $P'_3$. Reference numeral 707 denotes a distance r' between the center of gravity G' and the vector a'. Reference numeral 708 denotes an additional feature extraction region of the query image, which is a circle of radius r' centered on a center of gravity G'. Here, the point corresponding to the point $P_1$ is $P'_1$, the point corresponding to the point $P_2$ is $P'_2$, and the point corresponding to the point $P_3$ is $P'_3$.

Next, additional feature extraction processing and additional feature verification processing are described with reference to the flowchart shown in FIG. 9. In FIG. 9, step S801 expresses the additional feature extraction step, and step S802 expresses the additional feature verification step. The additional feature extraction step S801 includes step S803 of controlling the number of repetitions of additional feature extraction processing, step S804 of selecting shortest distance corresponding points, step S805 of determining an additional feature extraction region, and step S806 of extracting an additional feature. Further, the additional feature verification step S802 includes step S807 of calculating an additional feature similarity element, and step S808 of calculating an additional feature similarity.

Furthermore, the processing here is processing in which steps S717 and S718 are replaced with steps S801 and S802, respectively.

In the flowchart shown in FIG. 9, a variable i represents the number of repetitions, and count_max represents the upper limit of the number of repetitions. The upper limit count_max is a value determined in advance. In step S801, the repetition number of additional feature extraction processing is checked in step S803. In step S803, if the number of repetitions i at this point in time is smaller than the upper limit of the number of repetitions count_max, the processing proceeds to step S804.

In step S804, three sets of shortest distance corresponding points are randomly extracted from the shortest distance corresponding points list output in step S618, which is executed by the parameter calculation unit 25. Here, the sets of the extracted shortest distance corresponding points are described as the points $P_1$ and $P'_1$, the points $P_2$ and $P'_2$, and the points $P_3$ and $P'_3$ in FIGS. 8A and 8B.

In step S805, additional feature extraction regions $R_i$ and $R'_i$ are extracted from the normalized retrieval result candidate image and the query image, respectively. Here, $R_i$ is an additional feature region 608, and $R'_i$ is an additional feature region 708.

Next, in step S806, the average values of R, G, and B elements are extracted as additional features R(i), G(i), and B(i) from the additional feature extraction region $R_i$. Further, the average values of R, G, and B elements are extracted as additional features R'(i) and G'(i), and B'(i) from the additional feature extraction region $R'_i$.

In step S803, if the number of repetitions at the point in time is greater than or equal to the upper limit of the number of repetitions count_max, the processing proceeds to step S807. In step S807, an additional feature similarity element $E_i$ is calculated with Equation (18), using the additional features R(i), G(i), and B(i) that have been extracted from the additional feature extraction region $R_1$, and the additional features R'(i) G'(i), and B'(i) that have been extracted from the additional feature extraction region $R'_1$.

$$E_i = \frac{1}{3}(|R(i) - R'(i)| + |G(i) - G'(i)| + |B(i) - B'(i)|) \quad (18)$$

In step S808, the additional feature similarity E is calculated using Equation (19).

$$E = \frac{1}{\text{count\_max}} \sum_{i=0}^{\text{count\_max}-1} E_i \quad (19)$$

Note that although a configuration was described in which a circular region is extracted as an additional feature extraction region in step S805, the shape of the additional feature extraction region is not limited to a circle, and if the normalized retrieval result candidate image and the query image have the same shape, they may be extracted in a rectangular shape or another shape.

Furthermore, processing may be added in which the type of additional feature to be extracted is judged before extracting the additional feature. Alternatively, additional feature verification processing may be changed according to the type of additional feature.

Figure 10:
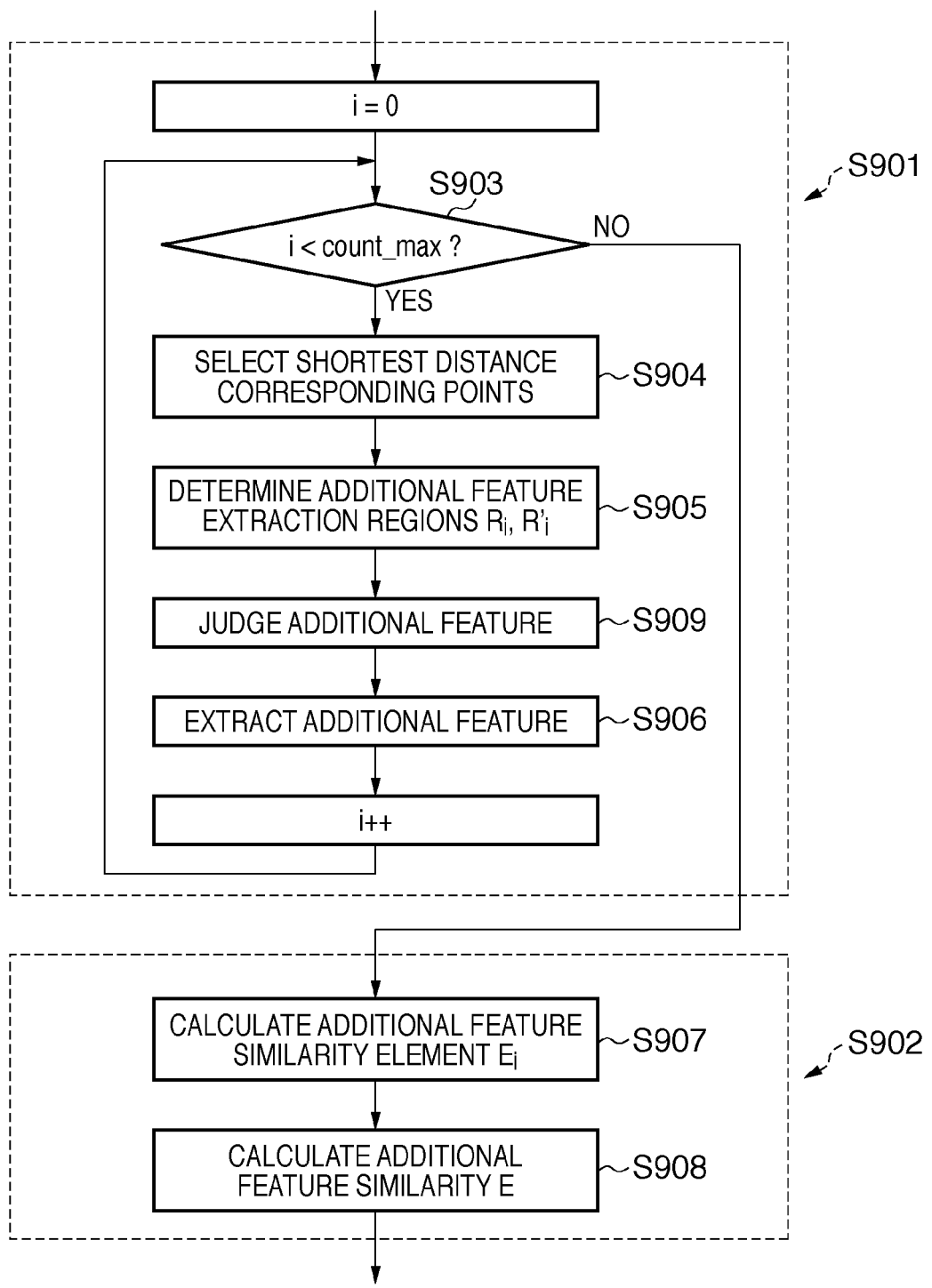
FIGS. 10 and 11 are flowcharts showing procedures of additional feature extraction processing and additional feature verification processing of the embodiment.

FIG. 10 is a flowchart showing a procedure of additional feature extraction processing and additional feature verification processing. In FIG. 10, step S901 expresses the additional feature extraction step, and step S902 expresses the additional feature verification step. In additional feature extraction step S901, step S903 is a step of controlling the repetition number of additional feature extraction processing, step S904 is a step of selecting shortest distance corresponding points, and step S905 is a step of determining an additional feature extraction region. Step S909 is a step of judging an additional feature that is added in the present embodiment. Step S906 is a step of extracting the additional feature. In additional feature verification step S902, step S907 is a step of calculating an additional feature similarity element, and step S908 is a step of calculating an additional feature similarity element.

Processing performed by the image retrieval apparatus in this case is processing in which steps S407 and S408 are replaced with steps S901 and S902, respectively. Below is a description of an example of an operation in the replaced portions.

In the flowchart shown in FIG. 10, a variable i represents the number of repetitions, and count_max represents the upper limit of the number of repetitions. The upper limit count_max is a value determined in advance. In step S901, the repetition number of additional feature extraction processing is checked in step S903. In step S903, if the number of repetitions i at the point in time is smaller than the upper limit of the number of repetitions count_max, the processing proceeds to step S904.

In step S904, three sets of shortest distance corresponding points are randomly extracted from the shortest distance corresponding points list output in step S618, which is executed by the parameter calculation unit 25. Here, the sets of the extracted shortest distance corresponding points are described as the points $P_1$ and $P'_1$, the points $P_2$ and $P'_2$, and the points $P_3$ and $P'_3$ in FIGS. 8A and 8B.

In step S905, additional feature extraction regions $R_i$ and $R'_i$ are extracted from the normalized retrieval result candidate image and the query image, respectively. Here, $R_i$ is an additional feature region 608, and $R'_i$ is an additional feature region 708.

Next, in step S909, a feature that is extracted as an additional feature is judged by examining the additional feature extraction regions. In the present embodiment, first, rectangular regions are set in the additional feature extraction regions $R_i$ and $R'_i$, and spectrum distributions $S_i$ and $S'_i$ are obtained by performing frequency transformation on each of the rectangular regions. If the spectrum distribution $S_i$ or $S'_i$ has a peak at fixed intervals, it is judged that the additional feature extraction region is a texture region. If not, next, it is checked whether the spectrum distribution $S_i$ or $S'_i$ is dominated by low frequency components. If the spectrum distribution is dominated by low frequency components, it is judged that the additional feature extraction region is a low contrast region in which the luminance change is small. If the spectrum distributions $S_i$ and $S'_i$ is not dominated by low frequency components, it is judged that the regions are non-texture, non-low contrast regions.

Next, in step S906, an additional feature is extracted based on the judgment result in step S909. Specifically, in step S909, if it is judged that the additional feature extraction region is a texture region, a spectrum distribution is extracted as an additional feature. If it is judged that the additional feature extraction region is a low contrast region, the average values of R, G, and B elements are extracted from the additional feature extraction region $R_i$ as the additional features R(i), G(i), and B(i). Further, the average values of R, G, and B elements are extracted from the additional feature extraction region $R'_i$ as the additional features R'(i), G'(i), and B'(i). If it is judged that the additional feature extraction region is a non-texture, non-low contrast region, the additional feature extraction regions $R_i$ and $R'_i$ are held as they are as additional features.

In step S903, if the number of repetitions at the point in time is greater than or equal to the upper limit of the number of repetitions count_max, the processing proceeds to step S907. In step S907, the additional feature similarity element $E_i$ is obtained based on the judgment result in step S909. Specifically, in step S909, if it is judged that the additional feature extraction region is a texture region, a correlation coefficient is calculated using the spectrum distributions $S_i$ and $S'_i$, and the correlation coefficient is used as the additional feature similarity element $E_i$. If it is judged that the additional feature extraction region is a low contrast region, similar to the above description, the calculation result obtained by solving Equation (18) is used as the additional feature similarity element $E_i$. If it is judged that the additional feature extraction region is a non-texture, non-low contrast region, a correlation coefficient is calculated using the pixel values of the additional feature extraction regions $R_i$ and $R'_i$, and the correlation coefficient is used as the additional feature similarity element $E_i$.

In step S908, similar to the above description, the additional feature similarity E is calculated using Equation (19).

Note that in step S909, rectangular regions are set in the additional feature extraction regions $R_i$ and $R'_i$, and the spectrum distributions $S_i$ and $S'_i$ are obtained by performing frequency transformation on each of the rectangular regions. However, the present invention is not limited to this, and it is sufficient if the regions of the normalized retrieval result candidate image and the query image on which frequency transformation is performed correspond to each other. For example, circumscribed rectangles of the additional feature extraction regions $R_i$ and $R'_i$ may be set, and frequency transformation is performed on the rectangular regions. Alternatively, an additional feature extraction region may be extracted in a rectangular shape, and frequency transformation may be implemented on the additional feature extraction region.

Further, edge extraction processing may be added to additional feature extraction processing, and if an edge is included in an additional feature extraction region, an additional feature may not be extracted from the additional feature extraction region.

Figure 11:
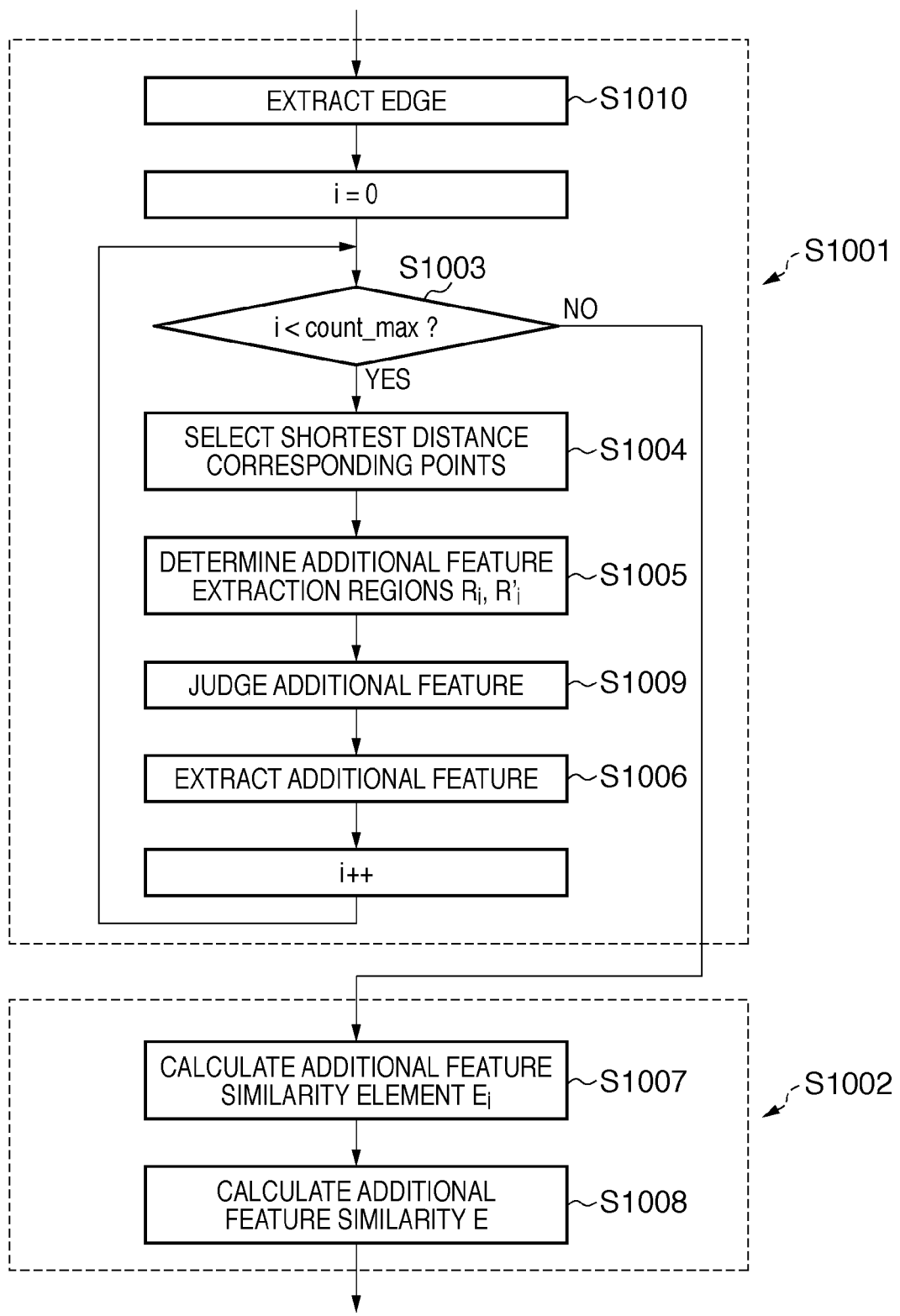

FIG. 11 is a flowchart showing a procedure of additional feature extraction processing and additional feature verification processing. In FIG. 11, step S1001 expresses the additional feature extraction processing step, and step S1002 expresses the additional feature verification step. Step S1010 is a step of extracting an edge from the entire image, step S1003 is a step of controlling the repetition number of additional feature extraction processing, step S1004 is a step of selecting shortest distance corresponding points, and step S1005 is a step of determining an additional feature extraction region. Step S1009 is a step of judging an additional feature, which is added in the present embodiment. Step S1006 is a step of extracting an additional feature, step S1007 is a step of calculating an additional feature similarity element, and step S1008 is a step of calculating an additional feature similarity element.

In step S1010, an edge is extracted from a query image. In the edge extraction, the zero crossing point of LOG (Laplacian of Gaussian) is extracted as an edge.

In step S1009, first, it is checked whether the edge extracted in step S1010 is included in the additional feature extraction region $R'_i$ of the query image determined in step S1005. If the edge is included, the additional feature extraction region $R'_i$ is deleted, and step S1006 is notified that the edge has been detected. If the edge is not included, the same processing as that in step S909 is executed.

In step S1006, if there is a notification of the edge detection from step S1009, no processing is performed. If there is no such a notification, the same processing as that in step S906 is executed.

Note that in the above embodiment, although the zero crossing pixel of LOG (Laplacian of Gaussian) is utilized at the time of edge extraction, the method is not limited to this as long as an edge can be extracted. Other edge extraction methods may be used, such as a method for extracting an edge by applying a Sobel filter, for example.

Further, processing may be added in which a noise edge is reduced after extracting an edge.

Specifically, a configuration is such that after extracting an edge in step S1010, the luminance amplitude value of the edge is obtained, and only the luminance edge that has a value greater than a threshold value determined in advance is determined as an edge.

Alternatively, after extracting an edge as an edge candidate in step S1010, the luminance amplitude value of the edge candidate is obtained, and the maximum value of the luminance amplitude value is used as the maximum luminance amplitude value. A configuration is such that only the ratio of the luminance amplitude value and the maximum luminance amplitude value that is greater than a threshold value determined in advance is determined as an edge.

Further, in step S714, judgment processing may be added in which it is judged whether or not additional feature verification is necessary based on the local feature similarity. As a result of this judgment processing, if it is determined that additional feature verification is not necessary, processing from steps S715 to S718 that are steps related to the additional feature extraction and verification are skipped. Further, a configuration is such that in step S719, the local feature similarity is used as the general similarity, and in step S720, a retrieval result candidate image is output as a retrieval result.

For example, if the maximum value of the local feature similarity is greater than or equal to a threshold value determined in advance, it is determined that additional feature verification is unnecessary. Alternatively, a configuration may be adopted in which if the ratio of the maximum value and second greatest value of the local feature similarity is greater than or equal to a threshold value determined in advance, it is determined that additional feature verification is unnecessary.

Furthermore, the general similarity calculation unit 29 may not be installed, and the additional feature similarity calculated by the additional feature verification unit 28 may be input into the retrieval result output unit 30. Furthermore, the retrieval result output unit 30 may examine the additional feature similarity delivered from the additional feature verification unit 28, and may output a retrieval result candidate image that has the additional feature similarity greater than or equal to a threshold value determined in advance in the additional feature similarity order as the retrieval results 31.

Note that the retrieval result output unit 30 is configured so as to select a retrieval result candidate image to be output as the retrieval result 31 using the threshold value. However, it may be configured such that a reference other than the threshold value is used as long as the retrieval result candidate image to be output can be selected as the retrieval result 31 with the additional feature similarity as a reference.

Further, although the retrieval result output unit 30 outputs a retrieval result candidate image as the retrieval result 31 in the additional feature similarity order, if the retrieval result candidate image to be output as the retrieval result 31 is selected and output, it is not necessary to output the image in order of additional feature similarity.

Further, although a configuration is adopted in which the general similarity calculation unit 29 is not installed, the general similarity calculation unit 29 may remain installed as long as the retrieval result candidate image to be output as the retrieval result 31 can be selected with the additional feature similarity as a reference. Specifically, a configuration may be adopted in which the general similarity is not calculated although the general similarity calculation unit 29 is installed. Alternatively, a configuration may be adopted in which although the general similarity calculation unit 29 calculates the general similarity, the retrieval result output unit 30 examines only the additional feature similarity delivered from the additional feature verification unit 28, and selects and outputs the retrieval result candidate image to be output as the retrieval result 31.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-115917, filed May 12, 2009, and No. 2009-144641, filed Jun. 17, 2009, which are hereby incorporated by reference herein in their entirety.

What is claimed is:

1. An image retrieval apparatus, comprising:
 an extraction unit configured to extract a local feature amount, which is a localized feature amount, from an input image;
 a retrieval unit configured to calculate a local feature similarity, which is a similarity between the extracted local feature amount and a local feature amount of each image registered in an image feature database, and acquire a plurality of candidate images based on the calculated local feature similarity;

a parameter calculation unit configured to calculate a geometric transformation parameter between each candidate image and the input image using the extracted local feature amount;

a determination unit configured to determine a calculation region on the input image corresponding to a global feature amount calculation region calculated in advance with respect to each candidate image, using the geometric transformation parameter;

a feature amount calculation unit configured to calculate a global feature amount in the calculation region determined by the determination unit;

a similarity calculation unit configured to calculate a similarity between each candidate image and the input image by comparing the global feature amount of each candidate image and the global feature amount of the input image; and an output unit configured to output each candidate image in order of similarity.

2. The image retrieval apparatus according to claim 1, further comprising a control unit configured to control execution of processing performed by the parameter calculation unit, the determination unit, the feature amount calculation unit, and the similarity calculation unit based on the local feature similarity calculated by the retrieval unit.

3. The image retrieval apparatus according to claim 2, wherein if a maximum value of the local feature similarity calculated by the retrieval unit is greater than or equal to a predetermined threshold value, the control unit performs control such that processing by the parameter calculation unit, the determination unit, the feature amount calculation unit, and the similarity calculation unit is not executed.

4. The image retrieval apparatus according to claim 2, wherein if a ratio of a maximum value and a second greatest value of the local feature similarity calculated by the retrieval unit is greater than or equal to a predetermined threshold value, the control unit performs control such that processing by the parameter calculation unit, the determination unit, the feature amount calculation unit, and the similarity calculation unit is not executed.

5. The image retrieval apparatus according to claim 1, further comprising:
an edge detection unit configured to detect an edge in the calculation region on the input image determined by the determination unit; and
a control unit configured to perform control, if the edge detection unit detects an edge in the calculation region on the input image, such that processing by the parameter calculation unit, the determination unit, the feature amount calculation unit, and the similarity calculation unit is not executed.

6. The image retrieval apparatus according to claim 1, further comprising a generation unit configured to generate a conjoined calculation region obtained by conjoining a plurality of global feature amount calculation regions on the input image obtained by the determination unit,
wherein the feature amount calculation unit calculates a global feature amount in the conjoined calculation region as a conjoined global feature amount, and
the similarity calculation unit calculates, by comparing a conjoined global feature amount of each candidate image and the conjoined global feature amount of the input image, a similarity between each candidate image and the input image.

7. The image retrieval apparatus according to claim 6, wherein the plurality of calculation regions adjoin each other.

8. The image retrieval apparatus according to claim 1, further comprising an image processing unit configured to perform image processing on a plurality of global feature amount calculation regions on the input image obtained by the determination unit,
wherein the feature amount calculation unit calculates a global feature amount from the plurality of calculation regions after image processing, and
the similarity calculation unit calculates, by comparing each global feature amount of the input image and a global feature amount after the image processing, a similarity between each candidate image and the input image.

9. A non-transitory computer-readable storage medium having stored therein a program for causing a computer to execute the steps included in a control method for the image retrieval apparatus according to claim 1.

10. The image retrieval apparatus according to claim 1, wherein the global feature amount comprises a color feature amount.

11. A control method for an image retrieval apparatus, comprising:
an extraction step of extracting a local feature amount, which is a localized feature amount, from an input image;
a retrieval step of calculating a local feature similarity, which is a similarity between the extracted local feature amount and a local feature amount of each image registered in an image feature database, and acquiring a plurality of candidate images based on the calculated local feature similarity;
a parameter calculation step of calculating a geometric transformation parameter between each candidate image and the input image using the extracted local feature amount;
a determination step of determining a calculation region on the input image corresponding to a global feature amount calculation region calculated in advance with respect to each candidate image, using the geometric transformation parameter;
a feature amount calculation step of calculating a global feature amount in the calculation region determined by the determination unit;
a similarity calculation step of calculating a similarity between each candidate image and the input image by comparing the global feature amount of each candidate image and the global feature amount of the input image; and
an output step of outputting each candidate image in order of similarity.

12. An image retrieval apparatus, comprising:
a local feature extraction unit configured to extract a local feature amount, which is a localized feature amount, from an input image;
an acquisition unit configured to calculate a local feature similarity, which is a similarity between the extracted local feature amount, and a local feature amount of each image registered in an image feature database, and acquire a plurality of candidate images based on the calculated local feature similarity;
an additional feature extraction unit configured to extract an additional feature, which is an added feature, from each of the input image and the acquired plurality of candidate images;
a calculation unit configured to calculate an additional feature similarity, which is a similarity between the additional feature extracted from each of the plurality of candidate images, and the additional feature extracted from the input image; and an output unit configured to calculate a general similarity using the local feature similarity and the additional feature similarity, and output a predetermined number of candidate images as a retrieval result in order of calculated general similarity.

13. The image retrieval apparatus according to claim 12, further comprising a normalization unit configured to perform normalization such that the plurality of candidate images acquired by the acquisition unit and the input image are matched in orientation and scale, and output the plurality of normalized candidate images to the additional feature extraction unit.

14. The image retrieval apparatus according to claim 13, wherein the normalization unit calculates a geometric transformation parameter between the plurality of candidate images and the input image, and performs the normalization using the calculated geometric transformation parameter.

15. The image retrieval apparatus according to claim 12, wherein the additional feature extraction unit excludes a region that extends beyond the input image when the input image and the candidate image are aligned and superimposed, from a region where the additional feature is extracted.

16. The image retrieval apparatus according to claim 12, wherein the additional feature extraction unit includes a judgment unit configured to judge, based on a spectrum distribution of a region where the additional feature is extracted, a type of additional feature to be extracted from the region.

17. The image retrieval apparatus according to claim 12, wherein the additional feature extraction unit includes an edge detection unit configured to detect an edge in a region where the additional feature is extracted, and if an edge is included in the region, excludes the region from a region where the additional feature is extracted.

18. The image retrieval apparatus according to claim 12, wherein if the local feature similarity is greater than or equal to a predetermined threshold value, the additional feature extraction unit does not perform processing.

19. A control method for an image retrieval apparatus, comprising:

a local feature extraction step of extracting a local feature amount, which is a localized feature amount, from an input image;

an acquisition step of calculating a local feature similarity, which is a similarity between the extracted local feature amount, and a local feature amount of each image registered in an image feature database, and acquiring a plurality of candidate images based on the calculated local feature similarity;

an additional feature extraction step of extracting an additional feature, which is an added feature, from each of the input image and the acquired plurality of candidate images;

a calculation step of calculating an additional feature similarity, which is a similarity between the additional feature extracted from each of the plurality of candidate images, and the additional feature extracted from the input image; and an output step of calculating a general similarity using the local feature similarity and the additional feature similarity, and outputting a predetermined number of candidate images as a retrieval result in order of calculated general similarity.

20. A non-transitory computer-readable storage medium having stored therein a program for causing a computer to execute the steps included in a control method for the image retrieval apparatus according to claim 19.

* * * * *